(12) United States Patent  
Kimura

(10) Patent No.: US 9,810,895 B2  
(45) Date of Patent: Nov. 7, 2017

(54) BIOLOGICAL OBSERVATION APPARATUS

(75) Inventor: Hiroyuki Kimura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 463 days.

(21) Appl. No.: 12/786,750

(22) Filed: May 25, 2010

(65) Prior Publication Data

US 2010/0310139 A1    Dec. 9, 2010

(30) Foreign Application Priority Data

May 29, 2009    (JP) .................. 2009-130880

(51) Int. Cl.
| | |
|---|---|
| *G06K 9/00* | (2006.01) |
| *G02B 21/36* | (2006.01) |
| *G02B 21/00* | (2006.01) |

(52) U.S. Cl.
CPC ......... *G02B 21/367* (2013.01); *G02B 21/002* (2013.01); *G02B 21/008* (2013.01); *G02B 21/0072* (2013.01); *G02B 21/0076* (2013.01)

(58) Field of Classification Search
CPC .......................... G02B 21/002; G02B 21/072
USPC ....................................................... 382/128
See application file for complete search history.

(56) References Cited

U.S. PATENT DOCUMENTS

| | | |
|---|---|---|
| 5,886,813 A | 3/1999 | Nagasawa |
| 6,711,283 B1 | 3/2004 | Soenksen |
| 6,917,696 B2 | 7/2005 | Soenksen |
| 7,035,478 B2 | 4/2006 | Crandall et al. |
| 7,602,996 B2 | 10/2009 | Maddison |

(Continued)

FOREIGN PATENT DOCUMENTS

| | | |
|---|---|---|
| EP | 1 447 699 A2 | 8/2004 |
| EP | 1804107 A1 | 7/2007 |

(Continued)

OTHER PUBLICATIONS

Extended European Search Report dated Oct. 5, 2010 (in English) in counterpart European Application No. 10005576.3.

(Continued)

*Primary Examiner* — Neha Patel  
*Assistant Examiner* — Trang Nguyen  
(74) *Attorney, Agent, or Firm* — Holtz, Holtz & Volek PC

(57) ABSTRACT

A biological observation apparatus includes a light source that radiates illumination light onto an observation region that includes a biological specimen; a CCD that acquires a macro image of the observation region; a light source that radiates excitation light onto the biological specimen; a micro-image acquisition unit that acquires a micro image of the biological specimen; an identification-information storing unit that stores identification information of the biological specimen; a biological-specimen specifying unit that extracts identification information of the biological specimen by performing image processing on the macro image, and specifies a biological specimen for which the extracted identification information corresponds to the identification information stored in the identification-information storing unit; and a pan controller that moves a capturing range of the micro-image acquisition unit such that the biological specimen is included in the viewing range of the micro image.

20 Claims, 23 Drawing Sheets

(56) References Cited

U.S. PATENT DOCUMENTS

| | | | |
|---|---|---|---|
| 7,646,495 | B2 | 1/2010 | Olsen et al. |
| 7,804,642 | B2 | 9/2010 | Nagasawa et al. |
| 8,503,790 | B2* | 8/2013 | Ito et al. ............... 382/190 |
| 2005/0161593 | A1 | 7/2005 | Kitahara |
| 2005/0280818 | A1 | 12/2005 | Yamashita et al. |
| 2006/0000962 | A1* | 1/2006 | Imabayashi .......... G02B 21/245 250/201.2 |
| 2007/0038384 | A1* | 2/2007 | Kirk et al. ................ 702/19 |
| 2007/0132998 | A1* | 6/2007 | Tang et al. .............. 356/417 |
| 2007/0206275 | A1 | 9/2007 | Hemmer et al. |
| 2008/0030849 | A1* | 2/2008 | Fukuyama ............... 359/381 |
| 2008/0055405 | A1* | 3/2008 | Maddison ................ 348/79 |
| 2008/0072723 | A1* | 3/2008 | Nakajima et al. ........... 83/102 |
| 2008/0095424 | A1* | 4/2008 | Iki et al. ................. 382/133 |
| 2009/0028414 | A1 | 1/2009 | Crandall et al. |
| 2009/0127474 | A1* | 5/2009 | Tsuneta et al. .......... 250/442.11 |
| 2009/0141126 | A1 | 6/2009 | Soenksen |
| 2010/0274798 | A1* | 10/2010 | Kato et al. ............... 707/769 |
| 2011/0002525 | A1* | 1/2011 | Mimura ................ C12M 23/48 382/133 |

FOREIGN PATENT DOCUMENTS

| | | |
|---|---|---|
| EP | 1 882 967 A1 | 1/2008 |
| EP | 1 918 751 A1 | 5/2008 |
| EP | 1 990 667 A1 | 11/2008 |
| JP | 10-096848 A | 4/1998 |
| JP | 2006-017489 A | 1/2006 |
| JP | 2006-023476 A | 1/2006 |
| JP | 2006-209698 A | 8/2006 |
| JP | 2008-281720 A | 11/2008 |
| WO | 2008153836 A2 | 12/2008 |

OTHER PUBLICATIONS

Japanese Office Action dated Feb. 25, 2014 issued in counterpart Japanese Application No. 2010-122846.

European Office Action dated Jul. 16, 2015, issued in counterpart European Application No. 10005576.3.

* cited by examiner

FIELD OF VIEW FOR HIGH
MAGNIFICATION OBJECT

BIOLOGICAL OBSERVATION APPARATUS

BACKGROUND OF THE INVENTION

1. Field of the Invention

The present invention relates to a biological observation apparatus.

This application is based on Japanese Patent Application No. 2009-130880, the content of which is incorporated herein by reference.

2. Description of Related Art

Conventionally, observation of various biological specimens has been performed using microscopes and the like, and microscope apparatuses with which image information is acquired by capturing an image of a biological specimen with a camera, etc., and movement and changes over time of the biological specimen are automatically tracked on the basis of the acquired image information have been known (for example, see Japanese Unexamined Patent Application, Publication No. 2008-281720). A microscope apparatus disclosed in Japanese Unexamined Patent Application, Publication No. 2008-281720 is configured so as to irradiate a specified biological specimen mounted on a stage with illumination light and to control the stage position, on the basis of image information acquired by capturing its transmitted light, so that the biological specimen does not leave the field of view. It is also configured so as to perform fluorescence observation by capturing fluorescence generated at the biological specimen by radiating excitation light while tracking the movement of the biological specimen.

However, with the microscope apparatus disclosed in Japanese Unexamined Patent Application, Publication No, 2008-281720, because the stage position is controlled in accordance with the movement of the specified biological specimen, there is the inconvenience that only the specified specimen can be tracked. In addition, there is a problem in that the biological specimen cannot be tracked when its shape, etc. changes. Furthermore, there is a problem in that, when attempting to acquire high-resolution image information, the biological specimen tends to exceed the viewing range, making it highly likely that it becomes impossible to track the specimen.

BRIEF SUMMARY OF THE INVENTION

The present invention provides a biological observation apparatus that is capable of performing detailed fluorescence observation without losing a biological specimen from the viewing range.

A first aspect of the present invention is a biological observation apparatus that includes a macro-image acquisition unit that acquires a macro image of an observation region that includes a biological specimen; a micro-image acquisition unit that acquires a micro image of the biological specimen; an identification-information storing unit that stores identification information of the biological specimen; a biological-specimen specifying unit that extracts identification information of the biological specimen included in the macro image by performing image processing on the macro image acquired by the macro-image acquisition unit and that specifies the biological specimen for which the extracted identification information corresponds to the identification information stored in the identification-information storing unit; and an adjuster that adjusts relative positions of the biological specimen and a viewing range of the micro image such that the biological specimen specified by the biological-specimen specifying unit is included in the viewing range of the micro image.

With this aspect, by acquiring a macro image, in which the size of one pixel is large, with the macro-image acquisition unit and by acquiring a micro image, in which the size of one pixel is small as compared with the macro image, with the micro-image acquisition unit, in the macro image, a large-area observation region can be displayed with a larger field of view than the micro image, whereas, in the micro image, a biological specimen can be displayed at higher resolution than the macro image. Therefore, for the biological specimen specified by the biological-specimen specifying unit on the basis of the identification information stored in the identification-information storing unit, the biological specimen can be kept within the viewing range of the macro image even when the biological specimen has moved.

That is, to perform long-term micro observation of a biological specimen originally intended for observation (for example, to observe a single cell, the required field of view is several tens of micrometers in length and several tens of micrometers in width) by also using the acquisition of the macro image of the observation region in coping with the movement of the biological specimen, it is possible to perform detailed micro observation without losing the biological specimen. As the identification information of the biological specimen, any information that allows the biological specimen to be identified through image processing may be used, examples of which include the position of the center of gravity, shape, size, brightness, etc. of the biological specimen.

With the above-described first aspect, a stage on which the biological specimen is mounted, a scanner that scans irradiation light emitted from a light source, and a controller that controls a swing-angle range of the scanner may be provided, and the macro-image acquisition unit may acquire the macro image by detecting observation light from the scanning range of the irradiation light scanned in the observation region by the scanner; the micro-image acquisition unit may acquire the micro image by detecting observation light from the scanning range of irradiation light scanned in the observation region by the scanner; and the controller may control the swing-angle range of the scanner such that the scanning amplitude of the irradiation light becomes smaller when acquiring the micro image than when acquiring the macro image.

With such a configuration, the observation light from the observation region, over which irradiation light is scanned by the scanner, is acquired by the macro-image acquisition unit to obtain a macro image of the observation region, and, additionally, the observation light from the biological specimen, over which irradiation light is scanned by the scanner, is detected by the micro-image acquisition unit to obtain a micro image of the biological specimen.

In this case, with the number of pixels maintained equal to each other between the macro image and the micro image, the scanning amplitude of the irradiation light is increased when acquiring the macro image; in addition, the scanning amplitude of the irradiation light is decreased when acquiring the micro image, and thus, in the macro image, an observation region can be displayed with a field of view of a larger area than the micro image, whereas, in the micro image, a biological specimen can be displayed at higher resolution than the macro image.

With the above-described first aspect, the adjuster may adjust the swing-range position of the scanner such that the biological specimen specified by the biological-specimen specifying unit is included in the viewing range of the micro image.

With such a configuration, the micro image can be easily tracked in accordance with the movement of the biological specimen.

With the above-described first aspect, an objective lens that radiates the irradiation light scanned by the scanner onto the biological specimen may be provided, and the adjuster may adjust relative positions of the objective lens and the stage in a direction that intersects the optical axis such that the biological specimen specified by the biological-specimen specifying unit is included in the viewing range of the micro image.

With such a configuration, the micro image can be tracked in accordance with the movement of the biological specimen over a larger area.

With the above-described first aspect, the macro-image acquisition unit may acquire a three-dimensional macro image of the biological specimen.

With such a configuration, with the three-dimensional macro image, the micro image can be tracked even for three-dimensional movement, etc, of the biological specimen.

With the above-described first aspect, a stage on which the biological specimen is mounted, a scanner that scans irradiation light emitted from a light source, and a controller that controls a swing-angle range of the scanner may be provided, and the macro-image acquisition unit may acquire the macro image by capturing observation light from an area in the observation region irradiated by the irradiation light emitted from the light source; the micro-image acquisition unit may acquire the micro image by detecting observation light from the scanning range of the irradiation light scanned in the observation region by the scanner; and the controller may control the swing-angle range of the scanner such that the viewing range for the micro image becomes smaller than the viewing range for the macro image.

With such a configuration, the micro the scanning amplitude of the irradiation light is decreased with respect to the field of view of the macro image when acquiring the micro image, and thereby, in the macro image, an observation region can be displayed with a field of view of a larger area than the micro image, whereas, in the micro image, a biological specimen can be displayed at higher resolution than the macro image.

With the above-described first aspect, the adjuster may adjust the swing-range position of the scanner such that the biological specimen specified by the biological-specimen specifying unit is included in the viewing range of the micro image.

With the above-described first aspect, an objective lens that radiates the irradiation light scanned by the scanner onto the biological specimen may be provided, and the adjuster may adjust relative positions of the objective lens and the stage in the direction that intersects the optical axis such that the biological specimen specified by the biological-specimen specifying unit is included in the viewing range of the micro image.

With the above-described first aspect, a stage on which biological specimen is mounted, a plurality of objective lenses of different magnifications that collect observation light from the biological specimen and an observation region that includes the biological specimen, and a revolver that holds the objective lenses and that disposes the objective lenses in an optical path of irradiation light in an exchangeable manner may be provided, and the macro-image acquisition unit may acquire a macro image of the observation region by capturing observation light coming from the observation region and collected by the objective lens having a low magnification; the micro-image acquisition unit may acquire a micro image of the biological specimen by capturing observation light coming from the biological specimen and collected by the objective lens having a high magnification; and the adjuster may adjust relative positions of the objective lenses and the stage in a direction that intersects the optical axis such that the biological specimen specified by the biological-specimen specifying unit is included in the viewing range of the micro image.

With such a configuration, irradiation light emitted from the light source is irradiated from the low-magnification objective lens onto the observation region, and the observation light therefrom is captured by the image acquisition unit, thereby acquiring the macro image of the observation region. On the other hand, the irradiation light emitted from the light source is radiated from the high-magnification objective lens onto the biological specimen that exists in the observation region, and the micro image of the biological specimen is acquired by capturing the observation light therefrom with the image acquisition unit.

In this case, the macro image acquired by using the low-magnification objective lens can display a large-area observation region with a larger field of view than the micro image. On the other hand, the micro image acquired by using the high-magnification objective lens can display the biological specimen at a higher resolution than the macro image.

In addition, by adjusting the relative position with respect to the stage in the direction intersecting the optical axis using the controller, the micro image can be tracked in accordance with the movement of the biological specimen. Therefore, for the biological specimen specified by the biological-specimen specifying unit, the biological specimen can be kept within the viewing range of the macro image even when the biological specimen has moved, and highly detailed micro observation can be performed for an extended period of time without losing the biological specimen.

With the above-described first aspect, the biological-specimen specifying unit may extract identification information of the biological specimen included in the macro image by using magnification information of the objective lens that acquires the micro image.

With such a configuration, the identification information of the biological specimen in the macro image and the identification information of the biological specimen in the micro image can be easily matched, and the biological specimen for micro observation can be readily specified.

With the above-described first aspect, the adjuster may adjust relative positions of the objective lens and the stage in a direction that intersects the optical axis such that the biological specimen specified by the biological specimen specifying unit is included in the viewing range of the micro image.

With the above-described first aspect, the macro-image acquisition unit may acquire a plurality of the macro images for which the observation regions are adjacent to each other and assemble the adjacent macro images.

With such a configuration, with the assembled large-area macro image, the biological specimen, which has a large movement range, can be tracked without losing it to perform micro observation.

With the above-described first aspect, the macro-image acquisition unit may acquire a macro image of the observation region on the basis of transmitted light or returning light from the observation region caused by irradiation of illumination light emitted from a light source, and the micro-image acquisition unit may acquire a micro image of the biological specimen on the basis of fluorescence excited by illumination light emitted from a light source.

With the above-described first aspect, when identification information of the biological specimen extracted from the macro image changes, the biological-specimen specifying unit may rewrite the identification information of the biological specimen stored in the identification-information storing unit.

With such a configuration, even when the identification information of the biological specimen changes during observation, observation can be performed by tracking the micro image without losing the biological specimen after the identification information has changed.

With the above-described first aspect, when the biological specimen undergoes cell division, the biological-specimen specifying unit may store identification information of the biological specimens newly formed by the cell division in the identification-information storing unit and assign mutually-linked identifiers to each of the new biological specimens formed by cell division from the same biological specimen.

With such a configuration, even when the biological specimen undergoes cell division during observation, the newly formed biological specimens are re-specified, and thus, observation can be performed while tracking the micro images for each of the biological specimens after the cell division. In addition, by assigning mutually-linked identifiers to the new biological specimens formed from the same biological specimen through cell division, the new biological specimens can be observed while associated with each other.

A second aspect of the present invention is a biological observation apparatus that includes a macro-image light source that radiates illumination light onto an observation region that includes a biological specimen; a macro-image acquisition unit that acquires a macro image of the observation region by capturing transmitted light or returning light from the observation region caused by radiation of the illumination light emitted from the macro-image light source; a micro-image light source that radiates excitation light onto the biological specimen; a micro-image acquisition unit that acquires a micro image of the biological specimen by detecting fluorescence generated at a position in the biological specimen irradiated by the excitation light emitted from the micro-image light source; an identification-information storing unit that stores identification information of the biological specimen; a biological-specimen specifying unit that extracts identification information of the biological specimen included in the macro image by performing image processing on the macro image and that specifies a biological specimen for which the extracted identification information corresponds to the identification information stored in the identification-information storing unit; and moving unit that moves the capturing range of the micro-image acquisition unit such that the biological specimen specified by the biological-specimen specifying unit is included in a viewing range of the micro image.

With this aspect, when the illumination light emitted from the macro-image light source is radiated onto the observation region, the transmitted light or returning light from the observation region is captured by the macro-image acquisition unit, and thereby, the macro image of the observation region is acquired. In addition, when the excitation light emitted from the micro-image light source is radiated onto the biological specimen that exists in the observation region, fluorescence generated at the biological specimen is detected by the micro-image acquisition unit, and thereby, the micro image of the biological specimen in acquired. The returning light is assumed to include reflection light reflected at a surface of the biological specimen and fluorescence generated at the biological specimen.

The macro image has a larger field of view than the micro image and displays a large-area observation region. Therefore, even when the biological specimen has moved, it can be kept within the viewing range of the macro image. On the other hand, the micro image is captured at higher resolution than the macro image. Therefore, as compared with the case of displaying the biological specimen with the macro image, the biological specimen can be displayed in more detail in the micro image.

In the biological observation apparatus according to this aspect, the biological-specimen specifying unit specifies the biological specimen for which the identification information extracted by performing image processing on the macro image corresponds to the identification information stored in the identification-information storing unit, the moving unit moves the capturing range of the micro-image acquisition unit such that the specified biological specimen is included in the viewing range of the micro image, and thereby, the micro image can be tracked in accordance with the movement of the biological specimen.

Accordingly, to perform micro observation of a biological specimen originally intended for observation for an extended period of time, it is possible to cope with the movement of the biological specimen by using the acquisition of the macro image of the observation region together therewith, and it is possible to perform detailed micro observation without losing the biological specimen from the field of view of the micro image when the biological specimen moves, etc.

In addition, if identification information for a plurality of biological specimens is stored in the identification-information storing unit, each of the plurality of the biological specimens can be specified. In addition, by moving the capturing range of the micro-image acquisition unit for each biological specimen with the moving unit, fluorescence observation can be performed by acquiring micro images for each of the plurality of the desired biological specimens.

With the above-described second aspect, the micro-image acquisition unit may include a scanner that scans the excitation light emitted from the micro-image light source, a detector that detects the fluorescence generated at the biological specimen, and an image-constructing unit that constructs the micro image on the basis of the fluorescence detected by the detector; and the moving unit may adjust a swing-angle range of the scanner.

With such a configuration, the detector detects the fluorescence generated by scanning the excitation light over the biological specimen with the scanner, and the micro image of the biological specimen is constructed by the image-constructing unit on the basis of the detected signal. Then, the swing-angle range of the scanner is adjusted by the moving unit, and the scanning range of the excitation light is changed in accordance with the movement of the biological specimen, thereby allowing the micro image to be easily tracked in accordance with the movement of the biological specimen.

With the above-described second aspect, an objective lens that irradiates the biological specimen with the excitation light emitted from the micro-image light source and that also collects the fluorescence generated at a position irradiated by the excitation light, and a stage on which the biological specimen is mounted and that is movable in a direction that intersects an optical axis of the objective lens may be provided, and the moving unit may relative move the objective lens and the stage in the direction that intersects the optical axis.

By relatively moving the objective lens and the stage in the direction that intersects the optical axis with the moving unit, the micro image can be tracked over a larger area in comparison with the scanning range of the scanner. Therefore, even when the biological specimen attempts to move out of the viewing range, it becomes possible to keep the biological specimen within the viewing range.

With the above-described second aspect, when identification information of the biological specimen extracted from the macro image changes, the biological-specimen specifying unit may rewrite the identification information of the biological specimen stored in the identification-information storing unit.

With the above-described second aspect, when the biological specimen undergoes cell division, the biological-specimen specifying unit may store identification information of the biological specimens newly formed by the cell division in the identification-information storing unit and assigns mutually-linked identifiers to each of the new biological specimens formed by cell division from the same biological specimen.

With the above-described second aspect, objective lenses, which have different magnifications, may be provided in an exchangeable manner, and the biological-specimen specifying unit may extract identification information of the biological specimen by using magnification information of the objective lenses.

With such a configuration, identification information of the biological specimens can be easily matched between images acquired with the objective lenses of different magnification by converting the magnification information of the objective lenses. Therefore, even when separate images of the biological specimen are to be acquired in multiple stages, by changing the magnification of the objective lenses, it is possible to readily specify the biological specimen for each image.

According to the present invention, an advantage is afforded in that detailed fluorescence observation can be performed without losing a biological specimen from the viewing range.

DETAILED DESCRIPTION OF THE INVENTION

A biological observation apparatus according to an embodiment of the present invention will be described below, with reference to the drawings.

Figure 1:
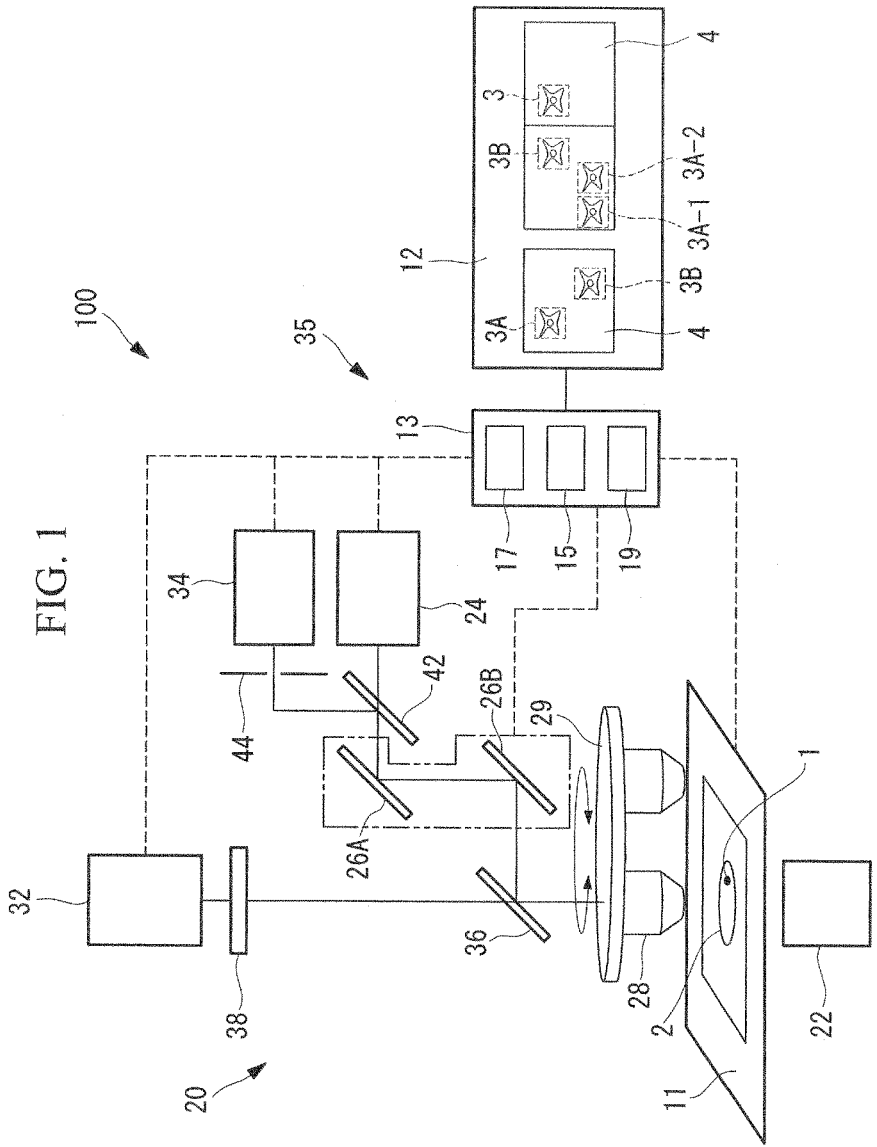
FIG. 1 is a diagram showing, in outline, the configuration of a biological observation apparatus according to an embodiment of the present invention.

As shown in FIG. 1, a biological observation apparatus 100 according to this embodiment is for performing detailed observation of a biological specimen 1, such as a cell, a microorganism, and the like. The biological observation apparatus 100 is provided with a stage 11 on which the biological specimen 1 is mounted; an optical system 20 that radiates irradiation light toward the biological specimen 1 on the stage 11 and that detects light (observation light) from the biological specimen 1 irradiated with the illumination light and a surrounding region (hereinafter referred to as "observation region") 2 that includes the biological specimen 1; a controller (control unit) 13 that controls the position of the stage 11 and the position irradiated by the irradiation light and that constructs images on the basis of fluorescence detected by the optical system 20; and a monitor 12 that displays images, etc. constructed by the controller 13.

The stage 11 is provided with a moving mechanism (not shown) and is arranged to be movable in a direction that intersects an optical axis of the irradiation light that is radiated onto the biological specimen 1 and the observation region 2 from the optical system 20. The stage 11 is configured such that one or a plurality of the biological specimens 1 are disposed in the observation region 2.

The optical system 20 is provided with a macro-image light source 22 that radiates illumination light, serving as the irradiation light, toward the observation region 2; a micro-image light source 24, such as a laser light source, etc., that radiates excitation light toward the biological specimen 1; galvanometer mirrors (scanners) 26A and 26B that scan the excitation light emitted from the micro-image light source 24 over the biological specimen 1; an objective lens 28 that collects light (transmitted light) that has passed through the observation region 2, among the illumination light radiated from the macro-image light source 22, and fluorescence generated at a position in the biological specimen 1 irradiated by the excitation light radiated from the micro-image light source 24 via the galvanometer mirrors 26A and 26B; a two-dimensional image acquisition device (a macro-image acquisition unit, hereinafter described with a "CCD" as an example) 32, such as a COD, that acquires a macro image 4 of the observation region 2 by capturing the transmitted light collected by the objective lens 28; and a PMT (photomultiplier tube) 34 that detects fluorescence collected by the objective lens 28.

This optical system 20 is provided with a mirror 36 that transmits the transmitted light collected by the objective lens 28 and that reflects fluorescence; an optical filter 38 that eliminates an unnecessary wavelength band from the transmitted light that is incident on the CCD 32 upon passing through the mirror 36; an excitation DM (dichroic mirror) 42 that transmits the excitation light emitted from the micro-image light source 24 and that reflects fluorescence returning from the biological specimen 1; and a pin hole 44 where the fluorescence, which enters the PMT 34 reflected by the excitation DM 42, passes through.

So long as emitted illumination light includes wavelengths that pass through the observation region 2, any light source may be employed as the macro-image light source 22, including, for example, a halogen lamp, a light-emitting diode, a laser, or the like. Instead of a laser light source, for example, a xenon lamp, a mercury lamp, and the like may be employed As the micro-image light source 24, so long as the emitted excitation light has a wavelength that excites fluorescent materials, etc. contained in the biological specimen 1.

The CCD is configured to have a large viewing range so as to capture the macro image 4 in which the observation region 2, having a large area, is captured. Because the large-area observation region 2 appears in the macro image 4, the moving biological specimen 1 can be kept within the viewing range. In addition, a region of the micro image 3 (micro image region) that is for capturing an image of the biological specimen 1 to be observed is displayed in the macro image 4. A highly sensitive EMCCD (electron Multiplying CCD) may be employed as the CCD 32.

The galvanometer mirrors 26A and 26B are an X-galvanometer mirror 26A and a Y-galvanometer mirror 26B that scan the excitation light emitted from the micro-image light source 24 and passing through the excitation DM 42 in the x-axis direction or the y-axis direction on the biological specimen 1 on the stage 11, and that are respectively disposed in the optical path of the excitation light in a manner that allows changing of a swing-angle range (swing-range position and scanning-amplitude for the excitation light).

The PMT 34 is configured so as to detect fluorescence generated at the biological specimen 1 irradiated with the illumination light and to output the detected signal (fluorescence brightness) for each pixel to the controller 13.

The galvanometer mirrors 26A and 26B and the PMT 34, together with the controller 13, constitute a micro-image acquisition unit 35 that acquires the micro image 3 of the biological specimen 1. It is preferable that the micro-image acquisition unit 35 be a laser-scanning microscope (LSM).

With this micro-image acquisition unit 35, the PMT 34 detects the detected signal in synchronization with the timing of scanning of the excitation light by the galvanometer mirrors 26A and 265, and the controller 13 constructs a two-dimensional image on the basis of the detected signal input from the PMT 34 for each pixel, thereby acquiring the micro image 3 of the biological specimen 1.

The micro-image acquisition unit 35 constituted in this way is configured to be able to adjust the field of view and pixel resolution by means of a galvano-zoom function, more specifically, by changing the scanning amplitude (maximum angle of scanning) of the galvanometer mirrors 26A and 26B while keeping the number of pixels constant.

Figure 2:
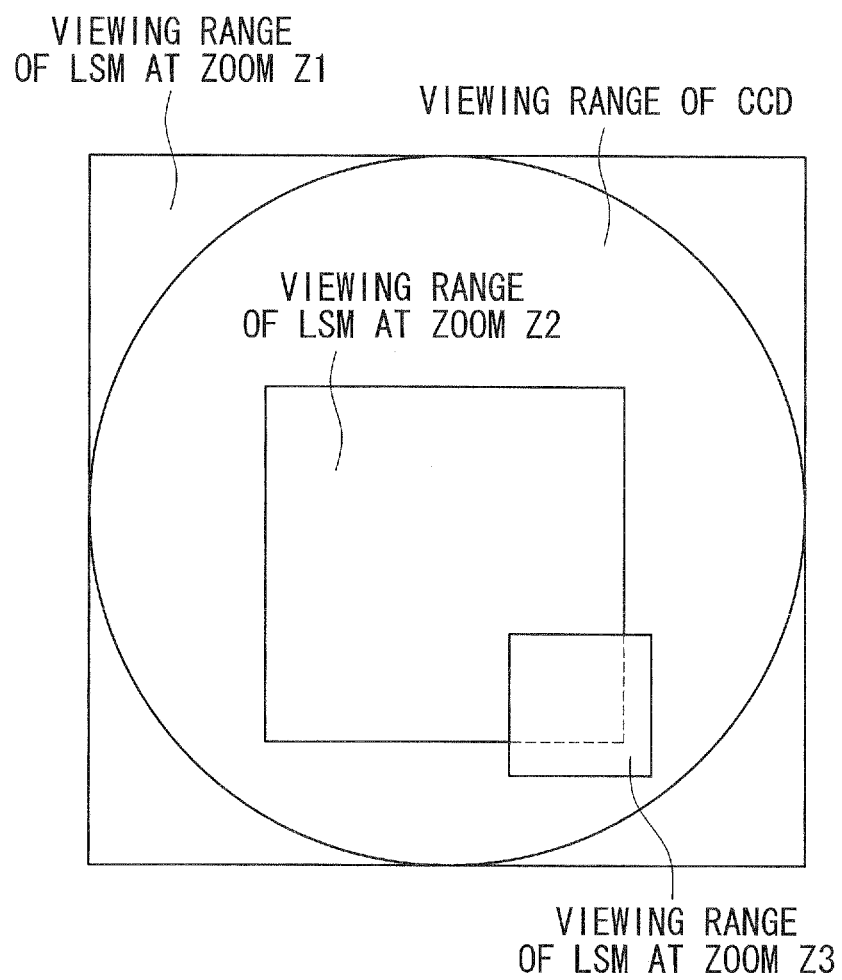
FIG. 2 is a diagram showing an example of the viewing range for each galvano zoom of an LSM in FIG. 1.

For example, as shown in FIG. 2, the resolution increases and the viewing range decreases in the order zoom Z1, zoom Z2, and zoom Z3, and an image having an image-acquisition range and resolution substantially equivalent to the macro image 4 of the observation region 2 taken with the CCD 32 is acquired with zoom 1. In addition, the micro image 3 in which the biological specimen 1 is displayed in detail with a smaller image-acquisition range and at a higher resolution than the macro image 4 of the observation region 2 taken with the CCD 32 is acquired with zoom Z2 or zoom Z3.

The objective lens 28 irradiates the biological specimen 1 with the excitation light that has been scanned by the galvanometer mirrors 26A and 26B reflected at the mirror 36, and, on the other hand, collects fluorescence generated at the biological specimen 1 due to irradiation with the excitation light and transmitted light that has passed through the observation region 2 due to irradiation with the illumination light. In addition, the objective lens 28 is provided in a revolver 29 together with a plurality of other objective lenses 28 having different magnifications, which are disposed therein in an exchangeable manner.

The controller 13 is provided with an identification-information storing unit 15 that stores identification information for identifying the biological specimen 1, a biological-specimen specifying unit 17 that specifies the biological specimen 1 for acquisition of the micro image 3, and a pan controller (adjuster, moving unit) 19 for adjusting the swing-angle range (swing-range position) of the galvanometer mirrors 26A and 26B (hereinafter referred to as "pan control").

The controller 13 serves as an image-constructing unit that constructs the micro image 3 described above and also performs storing processing for the identification-information storing unit 15, specifying processing for the biological-specimen specifying unit 17, and pan control for the pan controller 19.

As the identification information to be stored in the identification-information storing unit 15, any information may be used so long as it allows identification of the biological specimen 1 by performing image processing on the macro image 4 of the observation region 2 acquired by the CCD 32, examples of which include the position of the center of gravity, shape, size, brightness, etc. of the biological specimen 1.

The biological-specimen specifying unit 17 reads out the macro image 4 acquired by the CCD 32 and applies image processing thereto, thereby extracting the identification information of the biological specimen 1 included in the macro image 4. In addition, the biological-specimen specifying unit 17 is configured so as to specify as a target the biological specimen 1, for which the extracted identification information corresponds to the identification information stored in the identification-information storing unit 15.

The pan controller 19 scans the excitation light radiated onto the biological specimen 1 by performing pan control of the X-galvanometer mirror 26A and the Y-galvanometer mirror 26B such that the biological specimen 1 specified by the biological-specimen specifying unit 17 is included in the viewing range of the micro image 3. By doing so, the pan controller 19 moves the capturing range of the micro-image acquisition unit 35 in this manner. Note that, the controller 13 may control the movement of the stage 11 in the direction that intersects the optical axis of the objective lens 28.

Figure 3A:
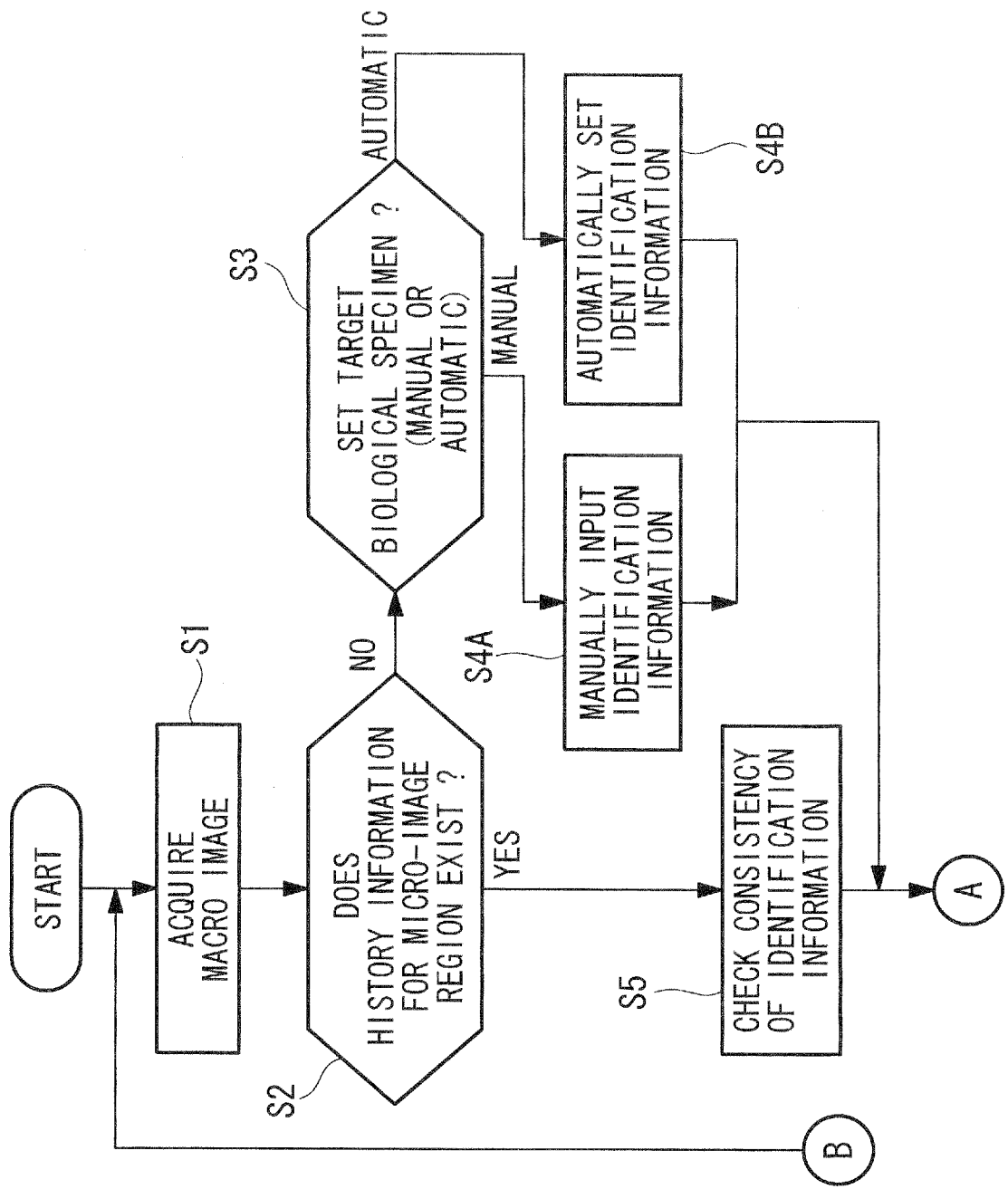
FIG. 3A is a flowchart showing a biological-specimen observation procedure performed by the biological observation apparatus of FIG. 1.
Figure 3B:
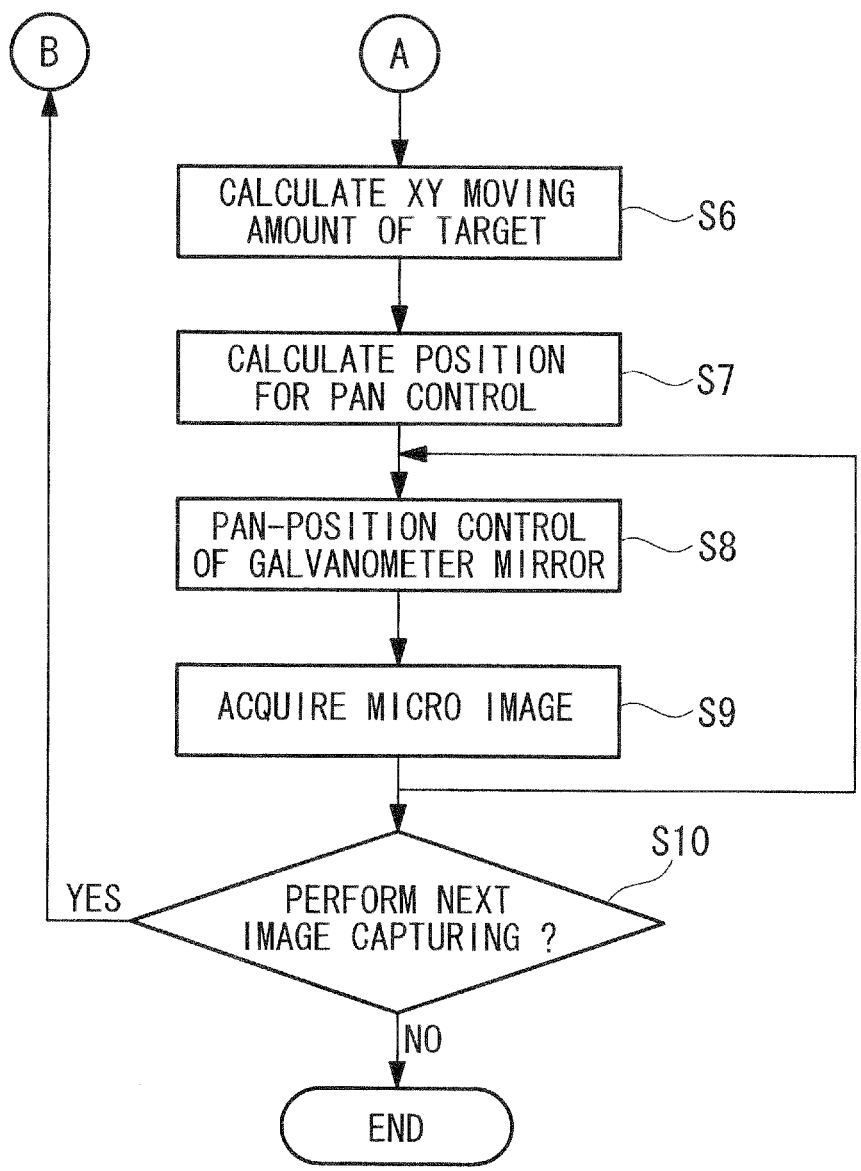
FIG. 3B is a flowchart showing a biological-specimen observation procedure performed by the biological observation apparatus of FIG. 1.

The operation of the thus-configured biological observation apparatus 100 according to this embodiment will be described with reference to the flowchart of FIGS. 3A and 3B.

When observing, for example, cultured cells, using the biological observation apparatus 100 according to this embodiment, a petri dish (not shown) in which a plurality of cells (biological specimens) are cultured is mounted on the stage 11, and the illumination light is radiated from the macro-image light source 22 toward the observation region 2 that includes the biological specimens 1 to be observed.

Then, the transmitted light that has passed through the observation region 2 is collected by the objective lens 28 and is incident on the CCD 32 upon passing through the mirror 36 and the optical filter 38. Accordingly, the transmitted light is captured in the CCD 32, and thus, the macro image 4 of the observation region 2 is acquired and is displayed on the monitor 12 (Step S1).

In the controller 13, it is judged whether history information of a micro-image region exists in the macro image 4, that is to say, whether the identification information for the biological specimen 1 to be observed is stored in the identification-information storing unit 15 (Step S2). If history information of the micro-image region does not exist ("NO" in Step S2), it is selected whether to manually set or automatically set the biological specimen 1 to be observed as a target (Step S3).

When the target is to be manually set ("manual" in Step S3), the desired biological specimens 1 that exist in the macro image 4 on the monitor 12 are individually selected by an observer. Accordingly, the identification information (position of center of gravity, shape, size, brightness, etc.) of the selected biological specimens 1 is input to the identification-information storing unit 15 and is stored therein as parameters (Step S4A).

On the other hand, when the biological specimens 1 to be observed are to be automatically set ("automatic" in Step S3), regions in a predetermined brightness value or greater, are identified by the Identification-information storing unit 15 as the biological specimens 1 to be observed, and the identification information thereof is stored as parameters (Step S4B).

In this way, the manually-set biological specimens 1 or the automatically-set biological specimens 1 are specified in the controller 13 as targets for micro observation with the micro image 3.

Figure 4A:
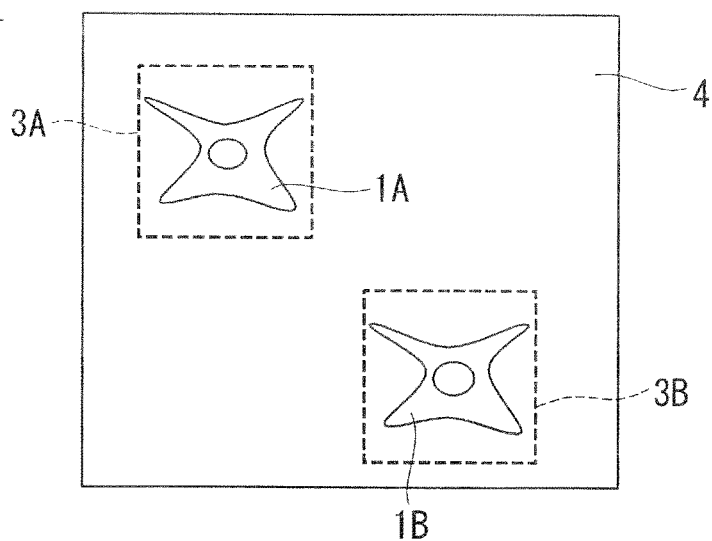
FIG. 4A is a diagram showing a macro image acquired in a previous round.
Figure 4B:
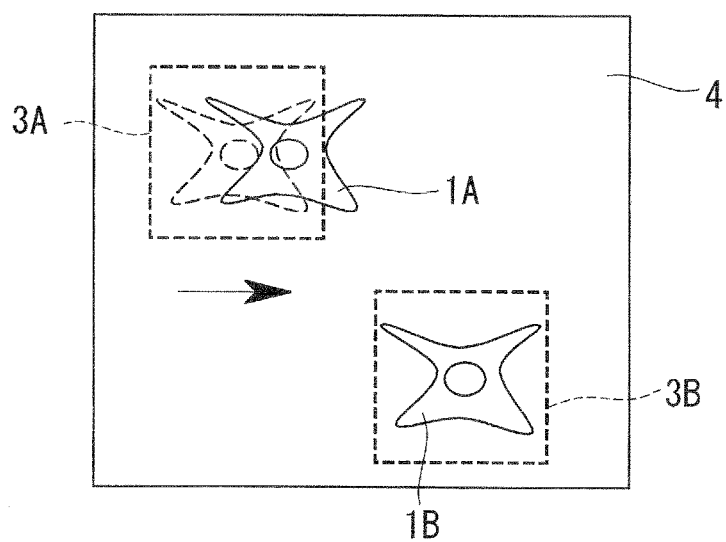
FIG. 4B is a diagram showing a macro image acquired in a current round.

In Step S2, in the case in which the macro image 4 as shown in FIG. 4A has been acquired in the past (previous round), and history information for the micro-image region thereof exists ("YES" in Step S2), the biological-specimen specifying unit 17 applies image processing to the macro image 4, as shown in FIG. 4B, that has been acquired in the current round, thereby extracting identification information for respective biological specimens 1A and 1B included in the macro image 4 of the current round.

Then, consistency is checked between the extracted identification information and the identification information in the macro image 4 acquired in the previous round, which is stored in the identification-information storing unit 15, and the biological specimens 1A and 1B to which the identification information corresponds are specified as targets for micro observation (Step S5).

Next, the controller 13 calculates the amount of movement in the X-axis direction and the Y-axis direction, respectively, from the positions of the centers of gravity, etc. of the target biological specimens 1A and 1B (Step S6). In this case, when a plurality of the biological specimens 1A and 1B are targeted, the amounts of movement are calculated for the respective biological specimens 1A and 1B. In addition, with respect to each of the biological specimens 1A and 1B, the controller 13 calculates an positions of the galvanometer mirrors 26A and 26B for the respective biological specimens if and if on the basis of the respective amounts of movement (Stop S7).

Next, in the case where micro observation of the biological specimen 1A is performed, on the basis of the pan positions of the galvanometer mirrors 26A and 26B calculated in Step S7, the pan controller 19 adjusts the pan positions (swing-angle ranges) of the X-galvanometer mirror 26A and the Y-galvanometer mirror 26B such that the biological specimen 1A is included in the viewing range of the micro image 3A (Step S8). In addition, depending on the magnification required for the micro observation, the galvano-zoom magnification can also be set.

In this state, the excitation light emitted from the micro-image light source 24 passes through the excitation DM 42, is reflected at the X-galvanometer mirror 26A and the Y-galvanometer mirror 26B, and is radiated onto the biological specimen 1A by the objective lens 28, via the mirror 36.

When fluorescence is generated at the position in the biological specimen 1A irradiated by the excitation light scanned by the X-galvanometer mirror 26A and the Y-galvanometer mirror 26B, the fluorescence is collected by the objective lens 2d and is reflected at the mirror 36, the Y-galvanometer mirror 26B, and the X-galvanometer mirror 26A. Then, the fluorescence is reflected at the excitation DM 42, is detected by the PMT 34 upon passing through the pin hole 44, and is input to the controller 13 as the detected signal.

A two-dimensional image is constructed in the controller 13 on the basis of the detected signals for individual pixels input from the PMT 34. Accordingly, the micro image 3A of the biological specimen 1A is acquired and is displayed on the monitor 12 (Step S9).

Next, in the case where micro observation of the biological specimen 1B is performed, the pan controller 19 adjusts the pan positions of the galvanometer mirrors 26A and 26B such that the biological specimen 1B is contained in the viewing range of the micro image 3B (Step S8). Then, the biological specimen 1B is irradiated with the excitation light, the generated fluorescence is detected by the PMT 34, and a two-dimensional image is constructed by the controller 13. Accordingly, the micro image 3B of the biological specimen 1B is acquired and is displayed on the monitor 12 (Step S9). Step S8 and Step S9 are repeated in this way for a plurality of the biological specimens 1A and 1B, respectively.

Figure 4C:
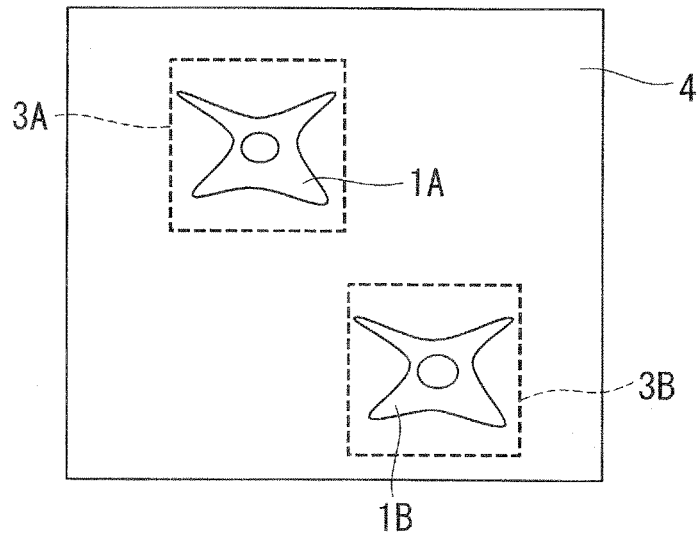
FIG. 4C is a diagram showing an acquisition range of a micro image, which has changed in accordance with the movement of a biological specimen.

In this case, by scanning the excitation light in accordance with the swing-angle ranges of the X-galvanometer mirror and the Y-galvanometer mirror for which pan control is performed by the pan controller 19 so as to contain the specified biological specimens 1A and 1B in the viewing ranges of the respective micro images 3A and 3B as shown in FIG. 4C, it is possible to track the respective micro images 3A and 3B in accordance with the movement of the biological specimens 1A and 1B.

Figure 5A:
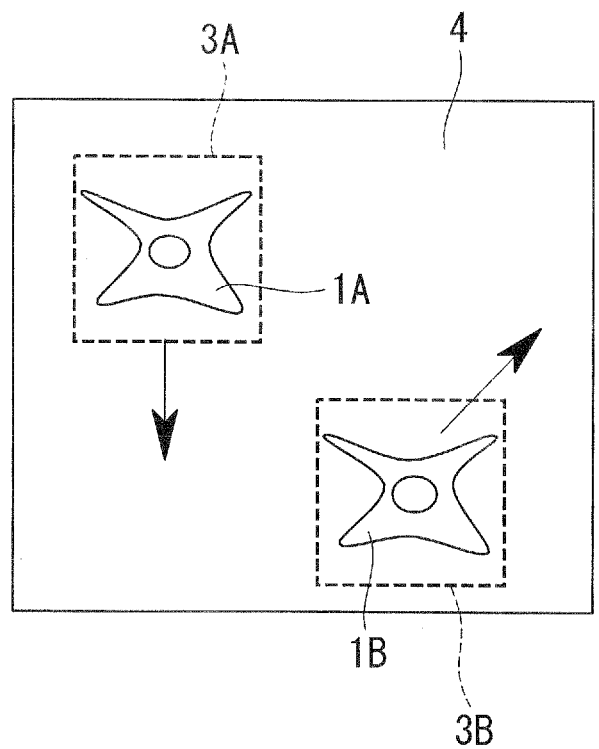
FIG. 5A is a diagram showing acquisition ranges of a macro image and a micro image before movement of the biological specimen.
Figure 5B:
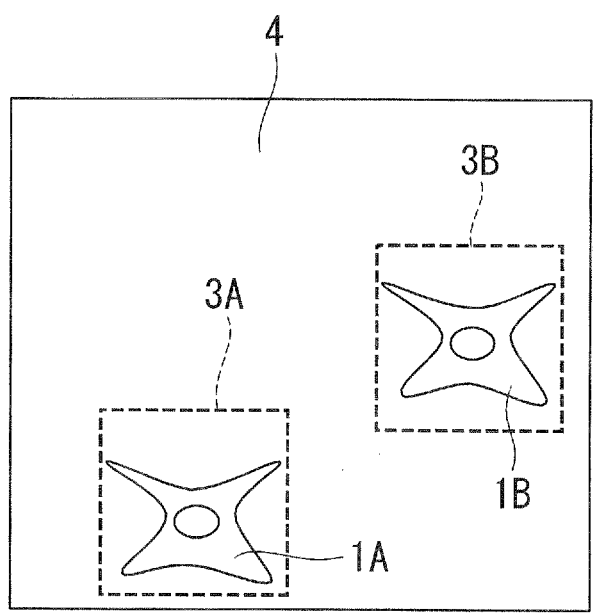
FIG. 5B is a diagram showing acquisition ranges of a macro image and a micro image after movement of the biological specimen.
Figure 6A:
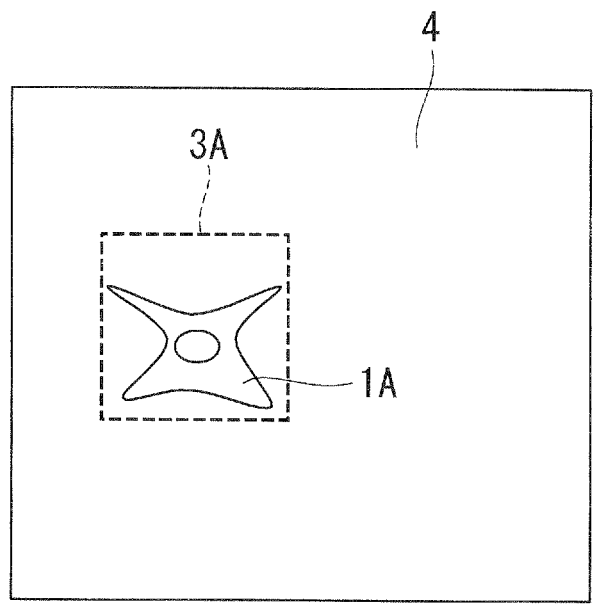
FIG. 6A is a diagram showing acquisition ranges of a macro image and a micro image before cell division of a biological specimen.
Figure 6B:
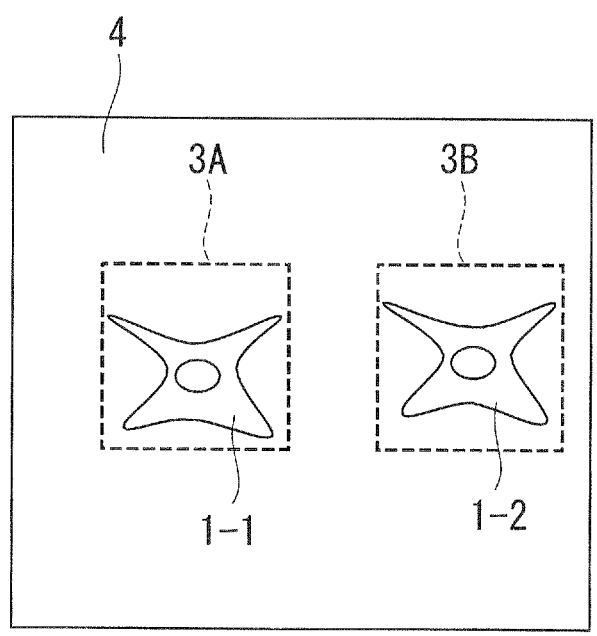
FIG. 6B is a diagram showing acquisition ranges of a macro image and a micro image after cell division of the biological specimen.
Figure 7A:
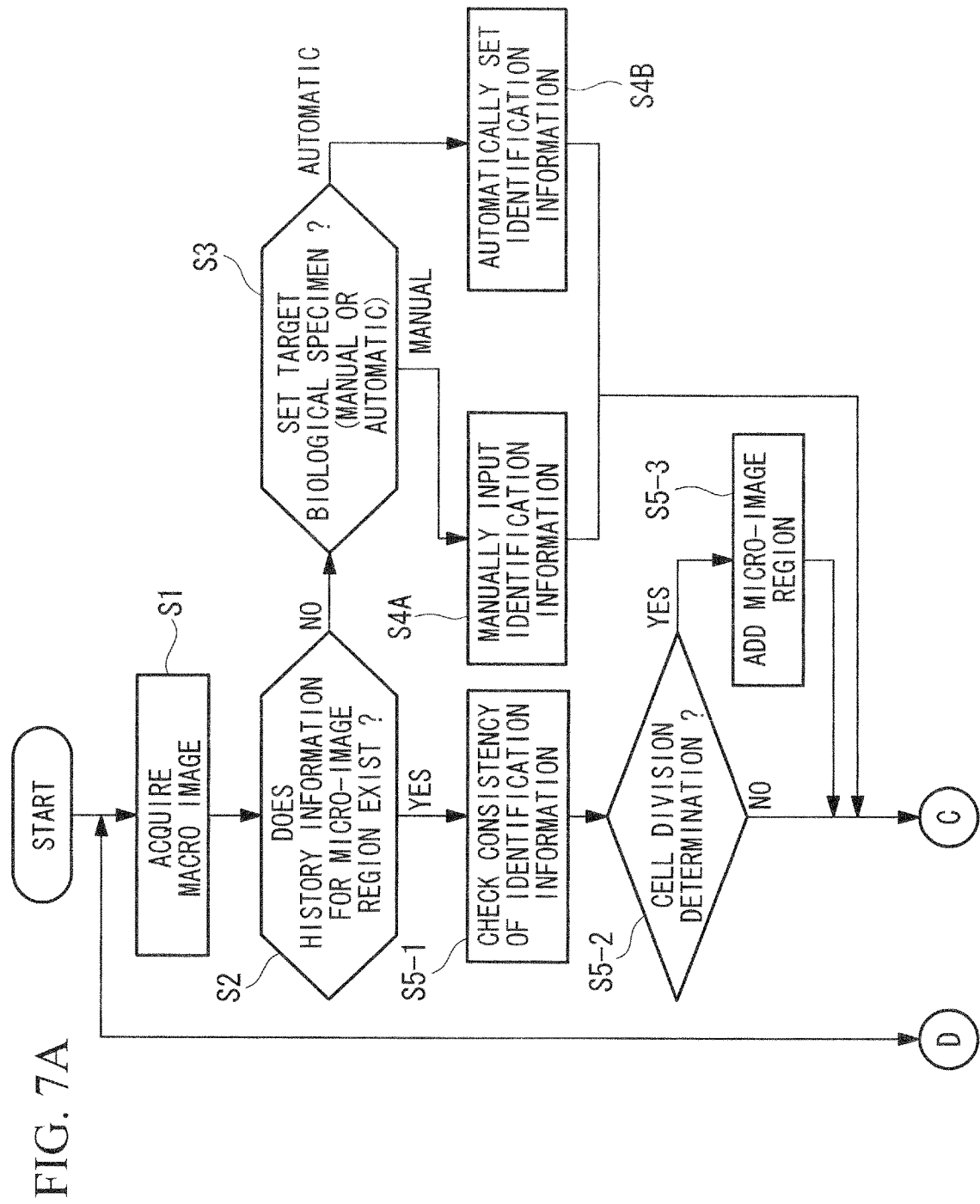
FIG. 7A is a flowchart showing an observation procedure for the biological observation apparatus of FIG. 1, in a case in which a biological specimen has undergone cell division.
Figure 7B:
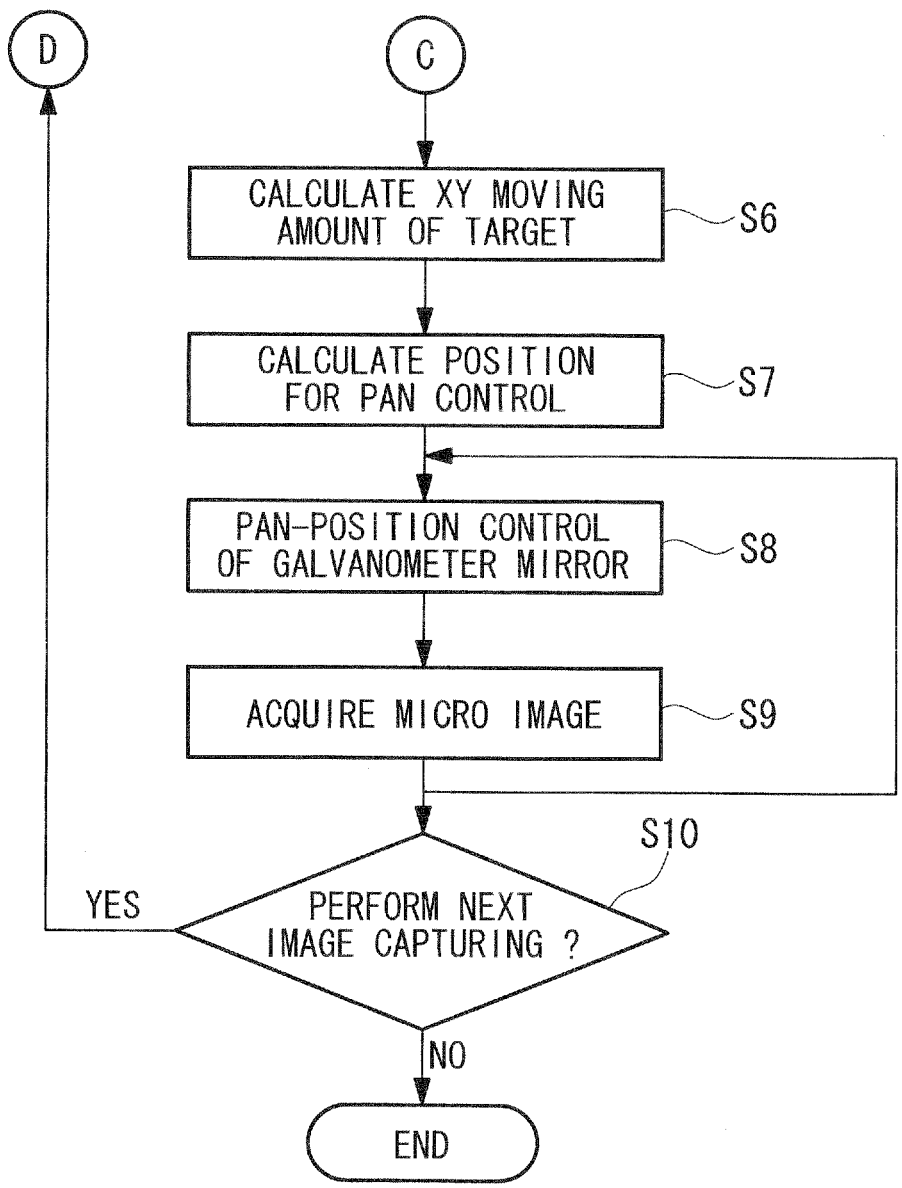
FIG. 7B is a flowchart showing an observation procedure for the biological observation apparatus of FIG. 1, in a case in which a biological specimen has undergone cell division.

For example, when the respective biological specimens 1A and 1B displayed in the micro images 3A and 3B on the macro image 4 move as shown in FIG. 5A, it is possible to track the respective micro images 3A and 3B in accordance with the respective movements of the biological specimens 1A and 1B, as shown in FIG. 5B.

The CCD 32 can perform observation using the macro image 4 at a faster rate in comparison with the micro-image acquisition unit 35 and, even in the case in which the movement speed of the biological specimens 1A and 1B is fast relative to observation by the micro images 3A and 3B, is capable of keeping the biological specimens 1A and 1B in the viewing range of the macro image 4 of the observation region 2.

Once micro images 3A and 3B of the biological specimens 1A and 1B are acquired by the micro-image acquisition unit 35, the process returns to Step S1 if next micro observation is to be subsequently performed, and the operation from Step S1 to Step S9 is repeated until observation is completed (Step S10).

As described above, with the biological observation apparatus 100 according to this embodiment, the macro image 4 is initially acquired; the target biological specimens 1A and 1B are specified by the biological-specimen specifying unit 17 by performing image processing on the macro image 4 of the observation region 2; and the excitation light is scanned by performing pan control of the galvanometer mirrors 26A and 26B with the pan controller 19 such that the specified biological specimens 1A and 1B are contained in the viewing ranges of the respective micro images 3A and 3B; thus, it is possible to track the respective micro images 3A and 3B, even when the biological specimens 1A and 1B individually move in different directions, etc.

That is, by also making use of macro observation of the biological specimen 1 in coping with the movement of the biological specimens 1, etc., it becomes possible to perform detailed micro observation for an extended period of time without losing the biological specimens 1A and 1B from the viewing range.

Although the case of observing two biological specimens 1A and 1B has been described as an example in this embodiment, one biological specimen 1 may be observed or three or more biological specimens 1 may be observed. In addition, in this embodiment, the PMT may be disposed on a transmission side of the biological specimen 1, and the transmitted light from the biological specimen 1 may be detected by this PMT.

In this embodiment, when, for example, the identification information of the biological specimen 1 extracted from the macro image 4 changes, the biological-specimen specifying unit 17 may rewrite the identification information of the biological specimen 1 stored in the identification-information storing unit 15 with the updated position of the center of gravity, shape, size, brightness, etc. By doing so, even when the identification information for the target biological specimen 1 changes during observation, observation of the micro image 3 can be performed without losing the biological specimen 1 whose identification information has changed.

In this embodiment, when, for example, the biological specimen 1 undergoes cell division, the biological-specimen specifying unit 17 may store identification information of the new biological specimens 1 formed by the cell division in the identification-information storing unit 15 and may assign mutually-linked identifiers to the respective new biological specimens 1 formed from the same biological specimen 1 by cell division.

For example, as shown in the flowcharts of FIGS. 6A, 6B, 7A, and 7B, the consistency of the identification information of the biological specimen 1 is checked in Step S5-1, and once two sets of identification information for biological specimens 1-1 and 1-2 are extracted from the macro image 4, the biological-specimen specifying unit 17 determines that the biological specimen 1 has divided into the two biological specimens 1-1 and 1-2 ("YES" in Step 5-2).

Then the identification information of the new biological specimens 1-1 and 1-2 formed by cell division is stored in the identification-information storing unit 15, and micro image regions of the biological specimens 1-1 and 1-2 are added thereto (Step S5-3). In addition, mutually-linked identifiers are assigned to the new biological specimens 1-1 and 1-2, respectively. Next, the controller 13 repeats Step S6 to Step S9 for each of the biological specimens 1-1 and 1-2 to acquire the micro images 3A and 3B.

By doing so, even when the biological specimen 1 undergoes cell division during observation, the newly formed biological specimen 1-2 is additionally specified, and the new biological specimens 1-1 and 1-2 can be tracked with the micro images 3A and 3B, respectively. In addition, by assigning the mutually-linked identifiers to the respective new biological specimens 1-1 and 1-2, the new biological specimens 1-1 and 1-2 can be observed while being mutually associated with each other. The biological specimen 1 may be re-specified by the biological-specimen specifying unit 17, not only when cell division occurs, but also when the biological specimens 1 combine, disappear, etc.

Although the biological specimens 1A and 1B are individually tracked by performing the pan control of the galvanometer mirrors 26A and 26B in this embodiment, for example, the biological specimens 1A and 1B may be individually tracked by moving the stage 11 with the controller 13 in the two dimensional directions (X-axis direction and Y-axis direction) that intersect the optical axis.

Figure 8A:
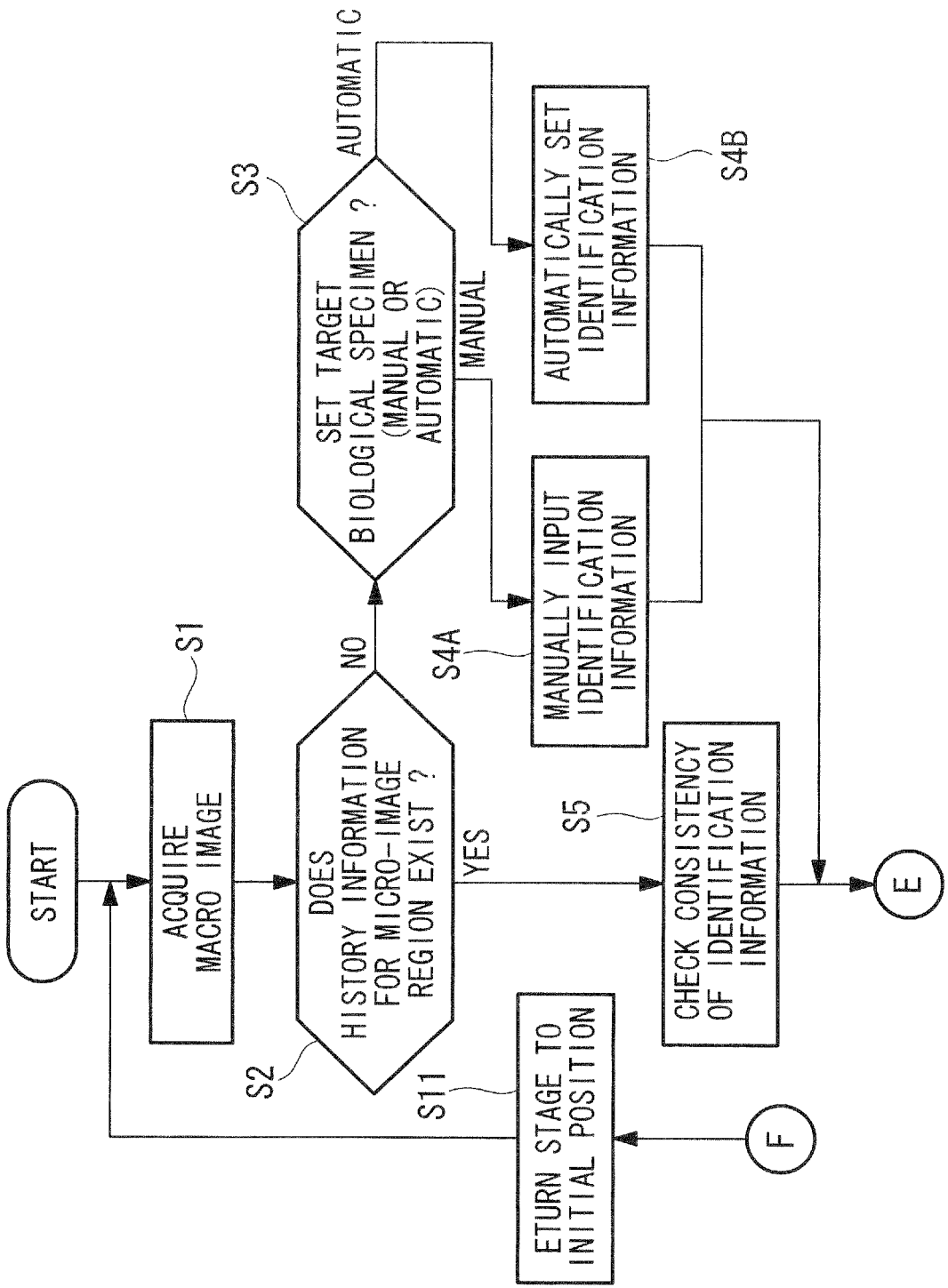
FIG. 8A is a flowchart showing a procedure for performing observation with the biological observation apparatus of FIG. 1 while controlling a stage.
Figure 8B:
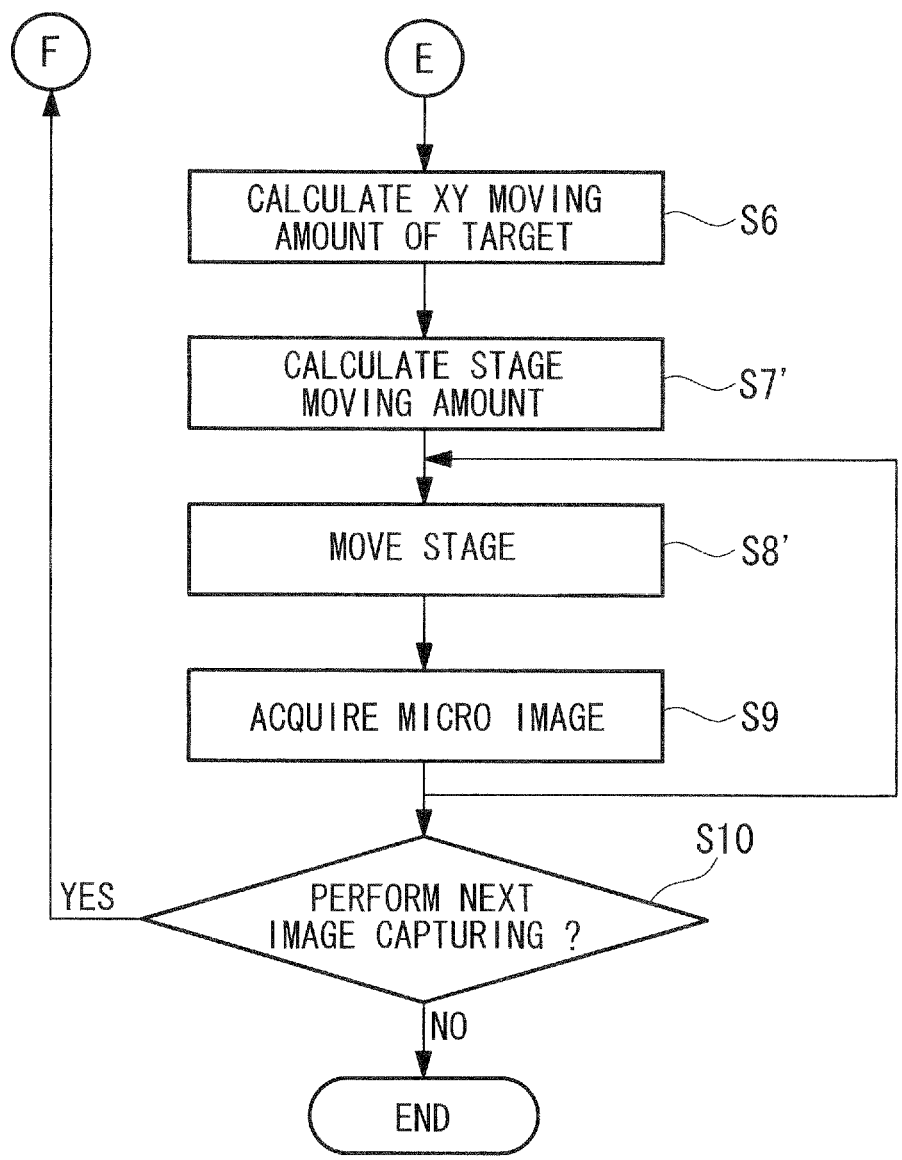
FIG. 8B is a flowchart showing a procedure for performing observation with the biological observation apparatus of FIG. 1 while controlling a stage.

For example, as shown in the flowchart of FIGS. 8A and 8B, once the amount of movement in the X-axis/Y-axis directions is calculated for the respective biological specimens 1A and 1B, in Step S6, the controller 13 calculates the amounts of stage movement for moving the stage 11 to the respective positions of the biological specimens 1A and 1B so that each of the biological specimens 1A and 1B is contained in the viewing ranges of the micro images 3A and 3B (Step S7').

In this case, the amount of movement of the stage 11 to each observation position should be individually calculated with the controller 13 by individually specifying the observation positions using the micro images 3A and 3B, with the position of the center of gravity of each of the biological specimens 1A and 1B as identification information.

Next, on the basis of the amount of movement of the stage 11 calculated for each of the biological specimens 1A and 1B, the stage 11 is moved so that the biological specimen 1A is contained in the viewing range of the micro image 3A (Step S8'), and the micro image 3A is acquired (Step S9'). Similarly, the stage 11 is moved so that the biological specimen 1B is contained in the viewing range of the micro image 3B (Step S8'), and the micro image 3B is acquired (Step S9).

When the next micro observation is to be performed subsequently ("YES" in Step 10), the stage 11 is returned to the initial position for macro observation (Step 11), and the process returns to Step S1. On the other hand, when observation is not to be performed, the process is terminated ("NO" in Step S10).

Figure 9A:
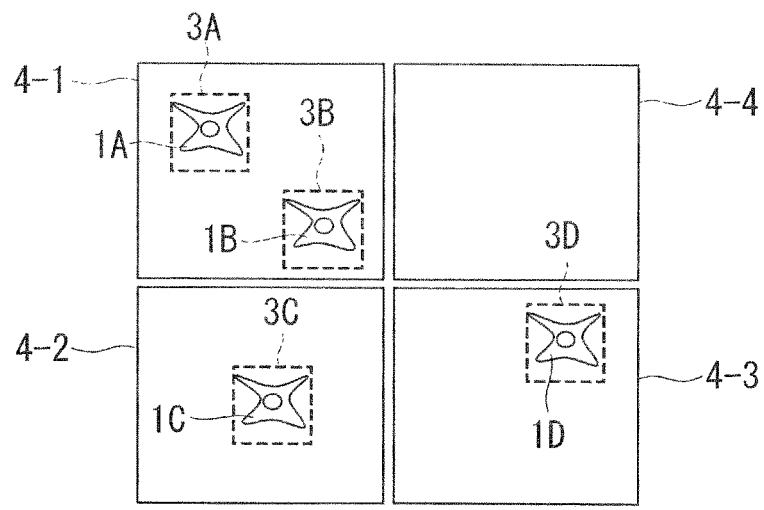
FIG. 9A is a diagram showing an assembled macro image.
Figure 9B:
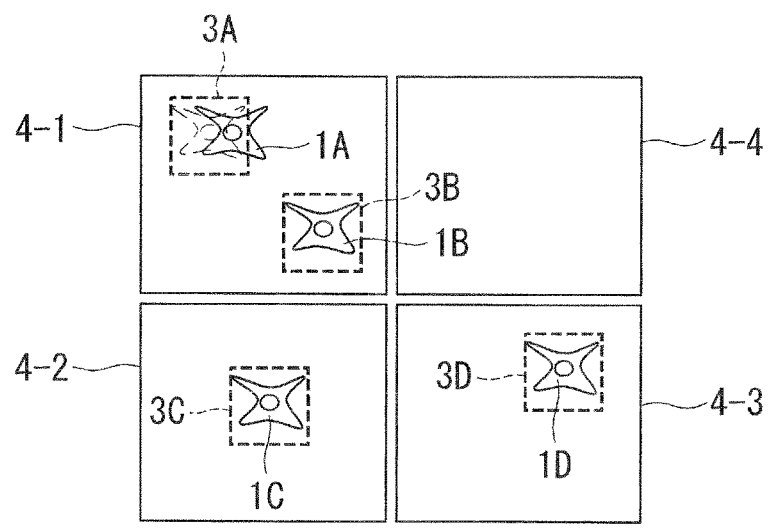
FIG. 9B is a diagram showing an assembled macro image from a current round.
Figure 9C:
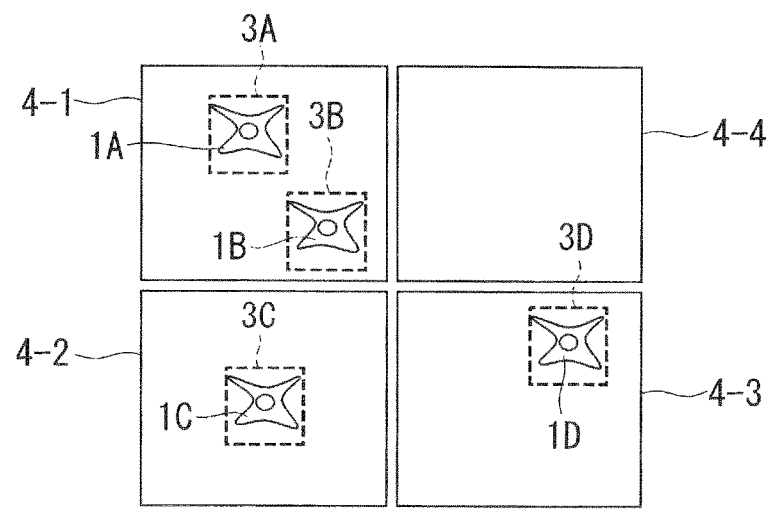
FIG. 9C is a diagram showing a micro-image acquisition range which is changed in accordance with the movement of a biological specimen.
Figure 10A:
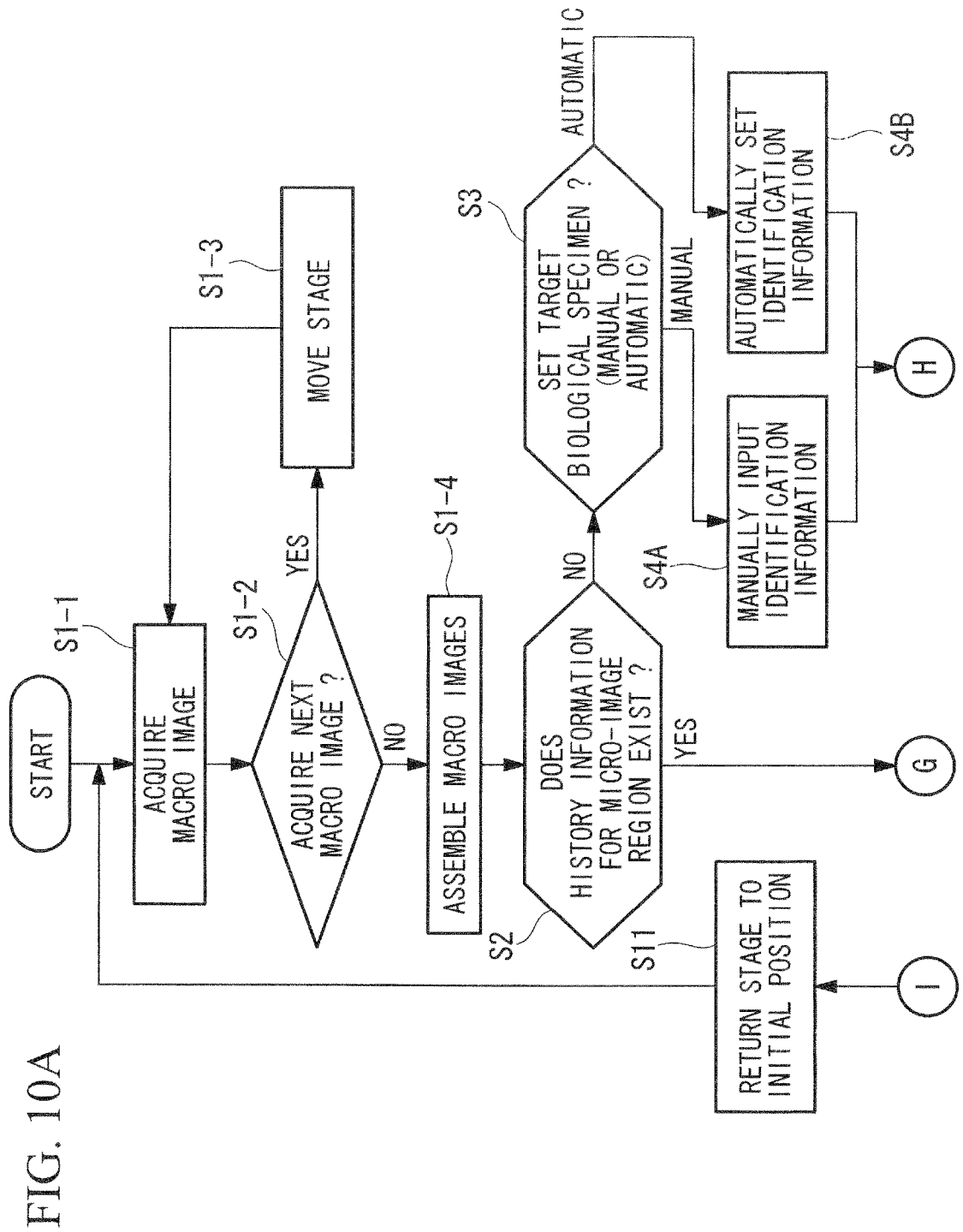
FIG. 10A is a flowchart showing a procedure for performing observation with the biological observation apparatus of FIG. 1 by assembling macro images of adjacent observation regions.
Figure 10B:
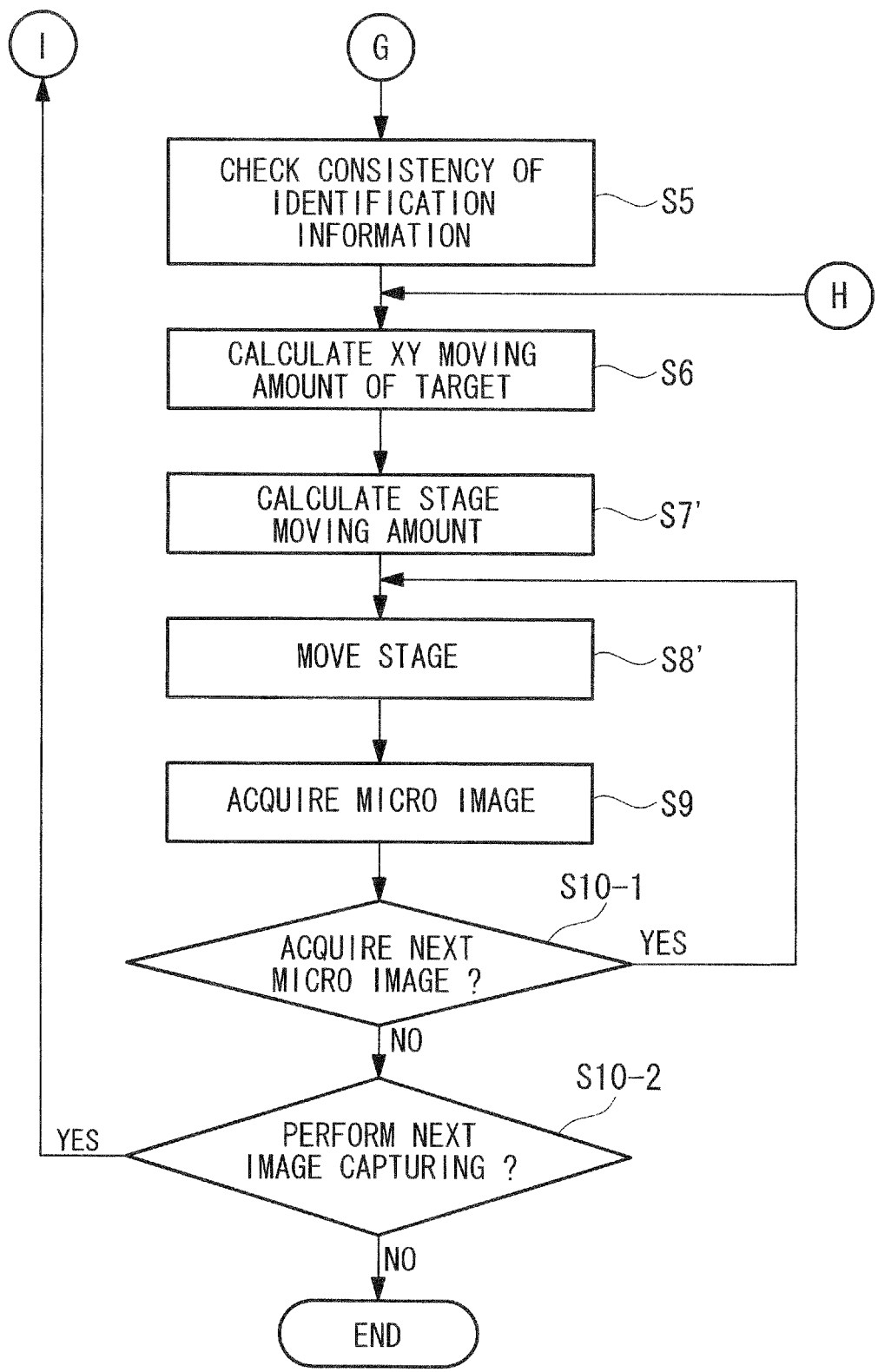
FIG. 10B is a flowchart showing a procedure for performing observation with the biological observation apparatus of FIG. 1 by assembling macro images of adjacent observation regions.

Although observation is performed with a single macro image 4 in this embodiment, for example, as shown in FIGS. 9A, 9B, and 9C, observation may be performed by assembling a plurality of macro images 4 whose observation regions 2 are adjacent to each other. For example, as shown in the flowchart of FIGS. 10A and 10B, to additionally acquire a macro image 4-2 of the observation region 2 ("YES" in Step S1-2), after acquiring a macro image 4-1 of the observation region 2 (Step S1-1) adjacent thereto, the stage 11 is moved to the adjacent observation region 2 (Step S1-3), and the macro image 4-2 is acquired (Step S1-1).

In addition, for example, once four macro images 4-1, 4-2, 4-3, and 4-4 of the four adjacent observation regions 2 are acquired ("NO" in Step S1-2), as shown in FIG. 9A, the acquired macro images 4-1, 4-2, 4-3, and 4-4 are assembled (Step S1-4).

Next, Step S2 to Step S9 are repeated within the range of all macro images 4-1, 4-2, 4-3, and 4-4 assembled as shown in FIG. 9B. In this case, consistency of the identification information is checked for each of the biological specimens 1A, 1B, 1C, and 1D in the respective macro images 4-1, 4-2, 4-3, and 4-4 (Step S5).

In addition, the amount of movement for individual biological specimens 1A, 1B, 1C, and 1D is calculated (Step S6), and the amount of stage movement is calculated for individual biological specimens 1A, 1B, 1C, and 1D (Step S7'). Then, Step S8' and Step S9 are performed for each of the biological specimens 1A, 1B, 1C, and 1D. Accordingly, macro images 3A, 3B, 3C, and 3D are acquired, within the respective macro images 4-1, 4-2, 4-3, and 4-4, as shown in FIG. 9C.

Once micro observation of the desired biological specimens 1A, 1B, 1C, and 1D is completed ("NO" in Step S10-1), when the next micro observation is to be performed subsequently, the stage 11 is returned to the initial position for macro observation (Step S11), and the process returns to Step S1. On the other hand, when observation is not to be performed, the process is terminated ("NO" in Step S10). By doing so, micro observation can be performed while tracking the movement of the biological specimen 1, etc., over a large area.

With this modification, for example, micro observation may be performed by using pan control of the galvanometer mirrors 26A and 26B together with moving the stage 11 in the X-axis/Y-axis directions. In this case, for example, the stage 11 should be moved to a position where a plurality of micro-image acquisition ranges are contained in the viewing range for the galvano-zoom magnification of 1.0, and micro-observation positions should be individually adjusted by pan control of the galvanometer mirrors 26A and 26B.

Figure 11:
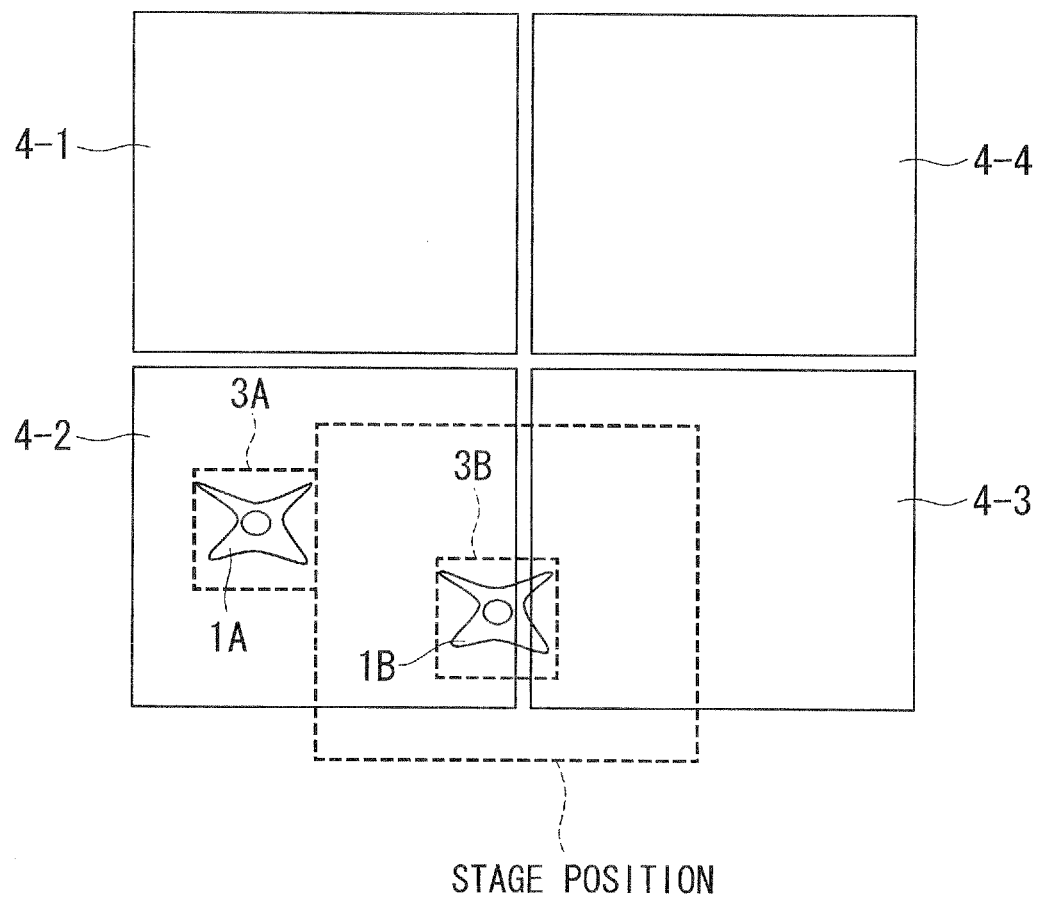
FIG. 11 is a diagram showing a case in which a biological specimen has moved into a space between macro images.

In addition, as shown in FIG. 11, when the biological specimen 1 exists at a position bridging the assembled macro images 4-2 and 4-3, to acquire the micro image 3B of the biological specimen 1B, the stage 11 may be moved such that the position of the center of gravity of the biological specimen 1B is located at the center of the macro image 4-2.

This embodiment can be modified as follows.

For example, in this embodiment, the macro image 4 of the biological specimen 1 is acquired using the macro-image light source 22 and the CCD 32; however, as a first modification, the macro image 4 may be acquired using the galvano-zoom function of the micro-image acquisition unit 35.

Figure 12A:
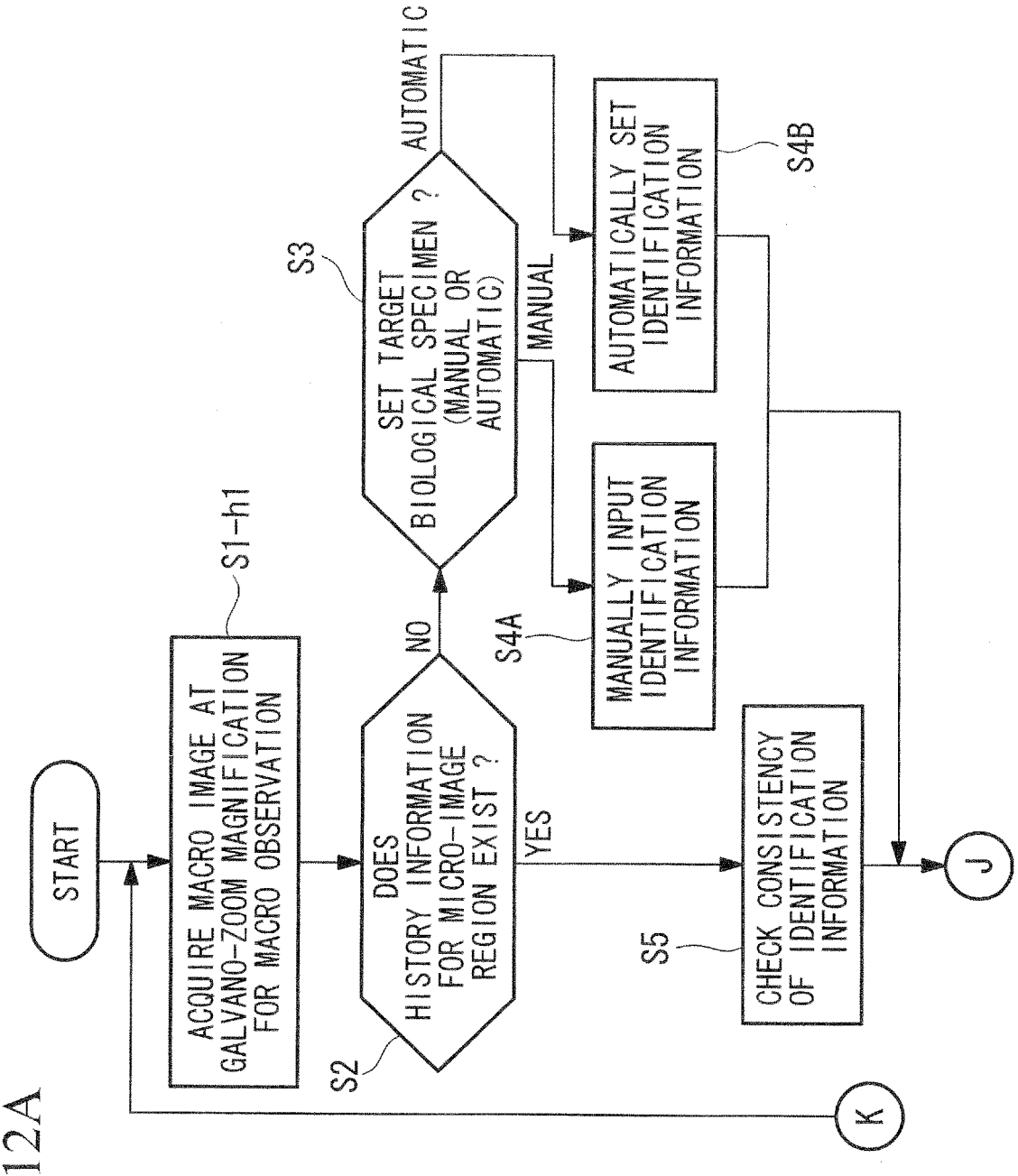
FIG. 12A is a flowchart showing an observation procedure for a biological observation apparatus according to a first modification of an embodiment of the present invention.
Figure 12B:
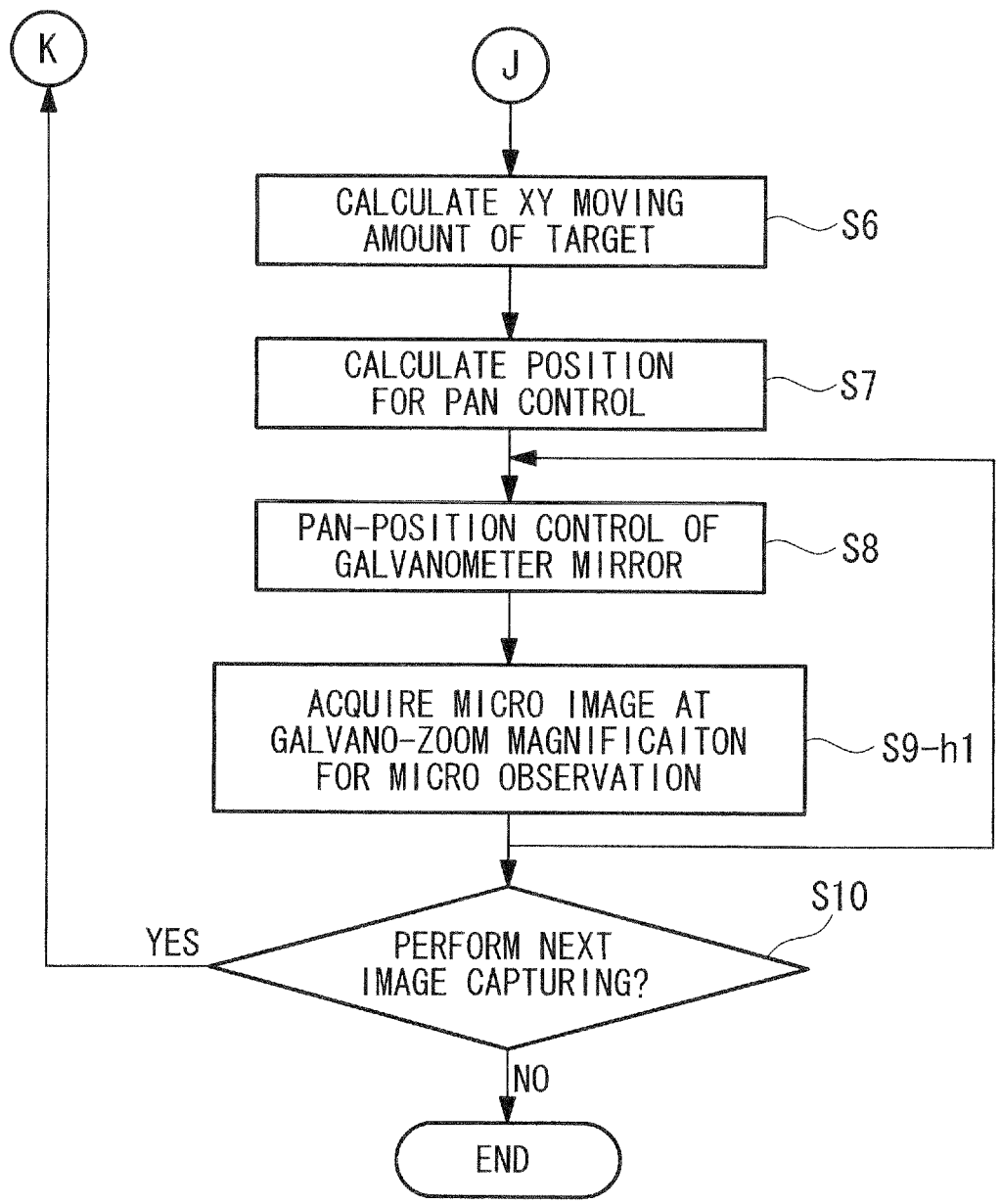
FIG. 12B is a flowchart showing an observation procedure for a biological observation apparatus according to a first modification of an embodiment of the present invention.

In this case, as shown in the flowchart of FIG. 12 FIGS. 12A and 12B, in Step S1-h1, for example, the galvano-zoom magnification of the galvanometer mirrors 26A and 26B is set to 1.0 (the maximum field of view of the galvanometer mirrors 26A and 26B) for macro observation (for example, see zoom Z1 shown in FIG. 2).

Then, the excitation light is emitted from the micro-image light source 24 to scan over the biological specimen 1 with the galvanometer mirrors 26A and 26B, and the macro image 4 is acquired with the controller 13 by detecting fluorescence generated at the biological specimen 1 with the PMT 34. Step S2 to Step S8 are the same as in the embodiment described above.

In addition, in Step S9-h1, the micro image 3 is acquired by setting the galvano-zoom magnification of the galvanometer mirrors 26A and 26B for micro observation (for example, see zoom Z2 or zoom Z3 shown in FIG. 2).

As described above, according to this modification, by performing macro observation and micro observation with the micro-image acquisition unit 35, it is possible to track and to observe even the biological specimen 1 that cannot be determined unless the micro-image acquisition unit 35 is used. In this modification, particularly for macro observation, a PMT may be disposed on the transmission side of the biological specimen 1, and the transmitted light from the biological specimen 1 may be detected with this PMT.

As a second modification, in the case in which the micro-image acquisition unit 35 is a laser-scanning microscope, optical slice images can be acquired. Here, for example, when acquiring the macro image 4 with the micro-image acquisition unit 35 by using the galvano-zoom function, a three-dimensional macro image 4 may be acquired by changing the relative positions of the objective lens 28 and the biological specimen 1 in the optical axis direction (Z-axis direction) with the controller 13.

For example, the three-dimensional image should be acquired by performing two-dimensional scanning on the biological specimen 1 in the X-axis/Y-axis directions with the galvanometer mirrors 26A and 26B, while moving the stage 11 in the Z-axis direction, and by stacking two-dimensional images of the biological specimen 1 at each relative position of the objective lens 28 and the biological specimen 1.

Figure 13A:
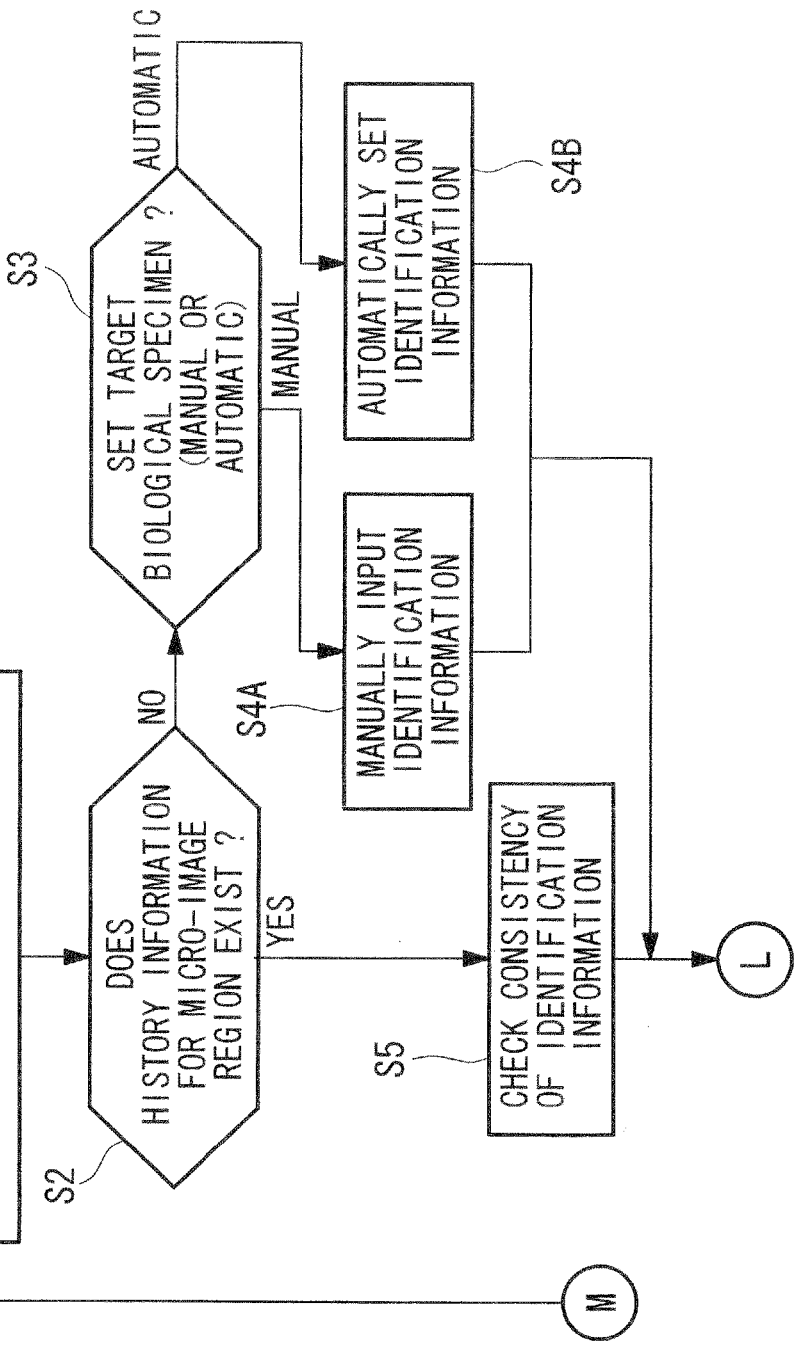
FIG. 13A is a flowchart showing an observation procedure for a biological observation apparatus according to a second modification of an embodiment of the present invention.
Figure 13B:
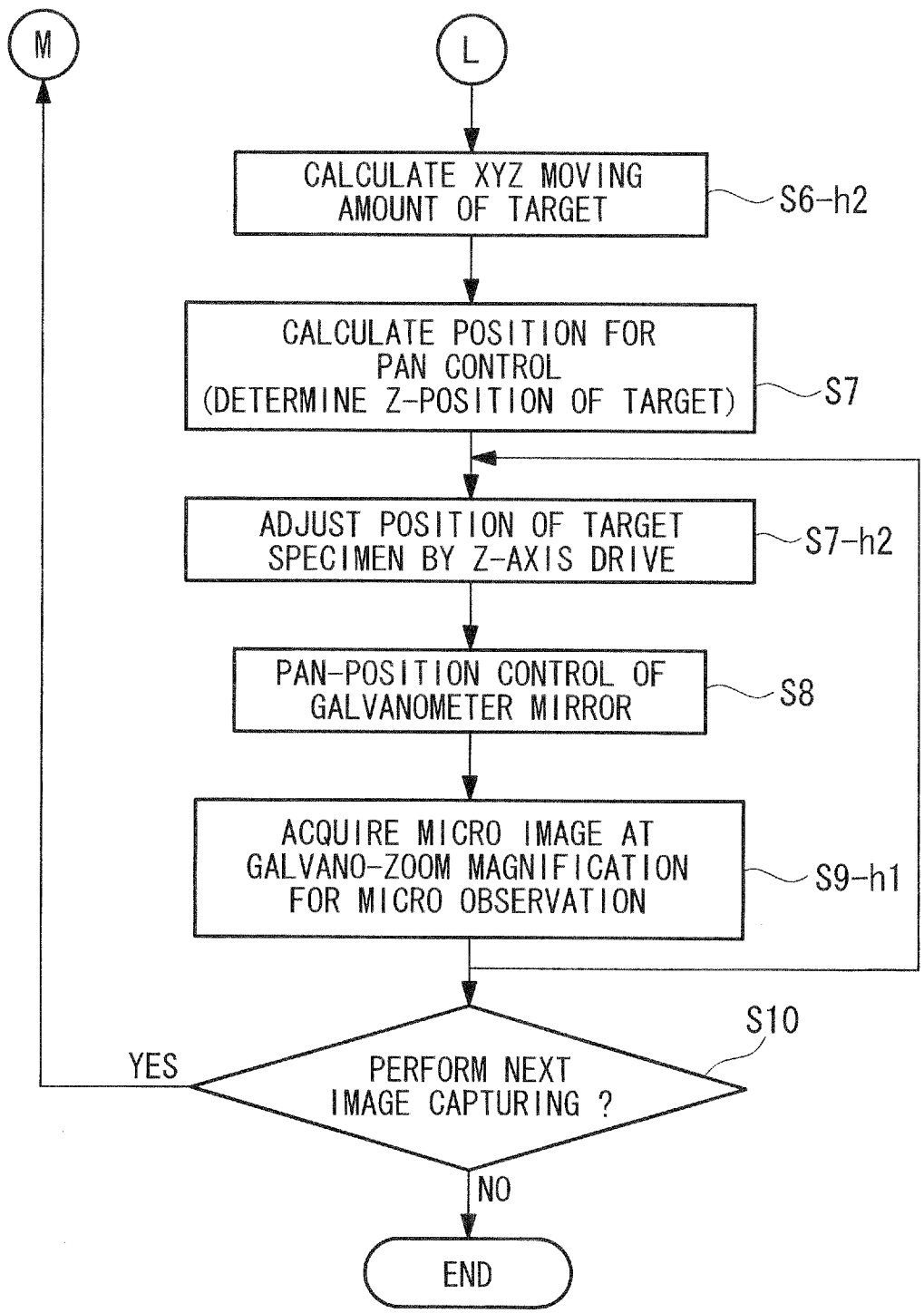
FIG. 13B is a flowchart showing an observation procedure for a biological observation apparatus according to a second modification of an embodiment of the present invention.
Figure 14A:
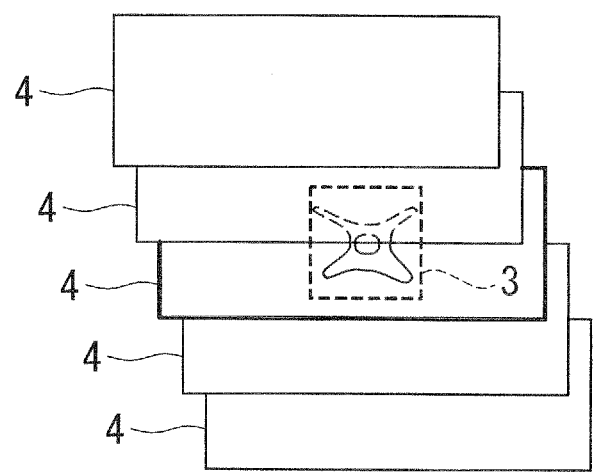
FIG. 14A is a diagram showing a three-dimensional macro image.

In this case, as shown in the flowchart of FIGS. 13A and 13B, the galvano-zoom magnification of the galvanometer mirrors 26A and 26B is set for macro observation, and, as shown in FIG. 14A, the three-dimensional macro image 4 is acquired by stacking the two-dimensional images of the X-axis/Y-axis directions of the biological specimen 1 (Step S1-h2). Then, after performing Step S2 to Step S5, the controller 13 calculates the amounts of movement from the position of the center of gravity of the target biological specimen 1 in the X-axis, Y-axis, and Z-axis directions, respectively (Step S6-h2).

Figure 14B:
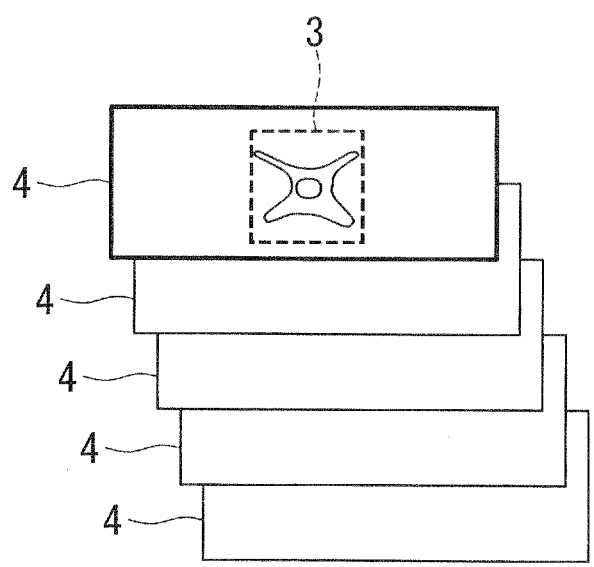
FIG. 14B is a diagram showing, in the three-dimensional macro image of FIG. 14A, a two-dimensional macro image in which a biological specimen exists.

In addition, the Z-axis position of the biological specimen 1 is determined (Step S7) by calculating control positions of the galvanometer mirrors 26A and 26B relative to the biological specimen 1 and by judging which two-dimensional image among the two-dimensional images stacked in the Z-axis direction, i.e. the three-dimensional macro image 4 shown in FIG. 14B, contains the biological specimen 1. Then, the stage 11 is moved in the Z-axis direction to adjust the relative positions of the objective lens 28 and the biological specimen 1 (Step S7-h2). Thereafter, Steps S8 to S10 are the same as in the first modification.

As a third modification, for example, the macro image 4 and micro image 3 may be acquired using the CCD 32 by switching the objective lens 28 to an objective lens of different magnification. In addition, when there are a plurality of targets for micro observation, the stage 11 should be moved relative to the individual biological specimens 1, and the micro images 3 should be individually acquired with the CCD 32.

In addition, magnification information of the objective lens 28 that acquires the micro image 3 may be used when extracting identification information of the biological specimen 1 contained in the macro image 4. By doing so, the identification information of the biological specimen in the macro image 4 and the identification information of the biological specimen 1 in the micro image 3 can be easily matched, and the biological specimen 1 for micro observation can be readily specified.

Figure 15A:
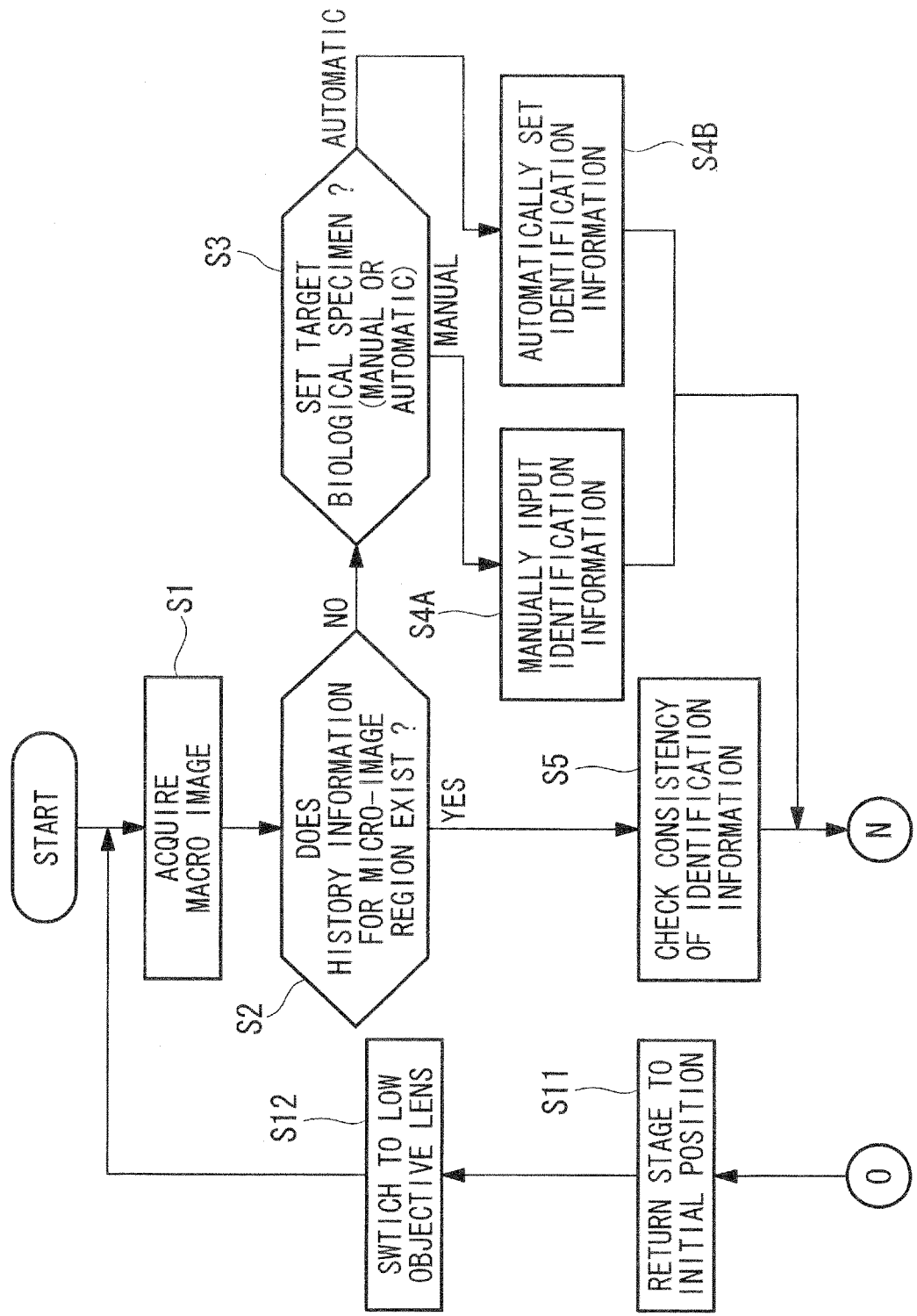
FIG. 15A is a flowchart showing an observation procedure for a biological observation apparatus according to a third modification of an embodiment of the present invention.
Figure 15B:
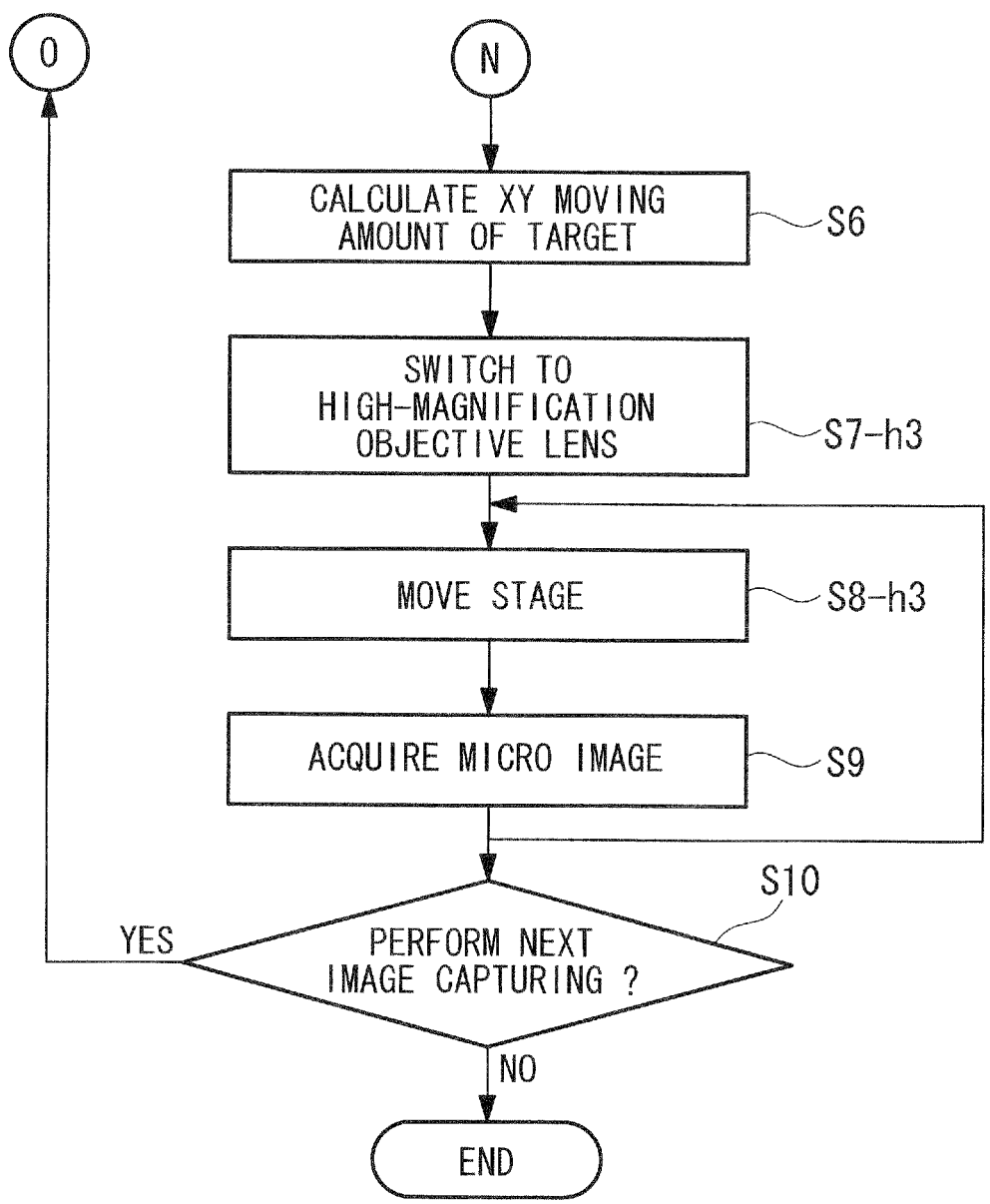
FIG. 15B is a flowchart showing an observation procedure for a biological observation apparatus according to a third modification of an embodiment of the present invention.
Figure 16:
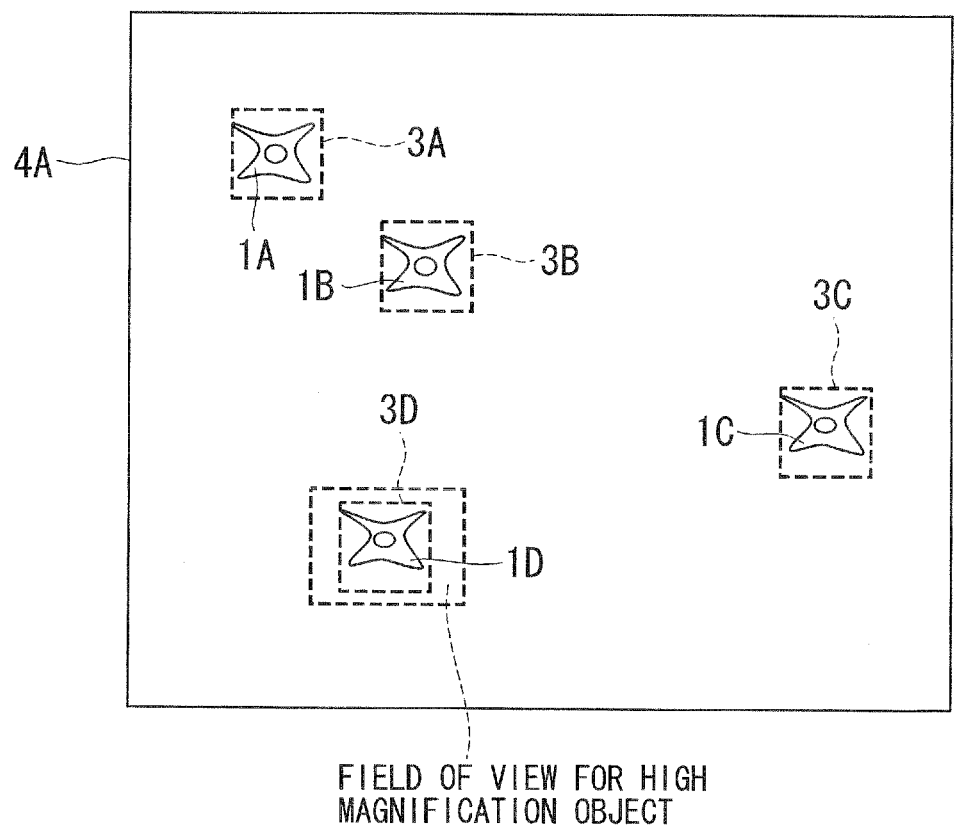
FIG. 16 is a diagram showing the field of view of a high-magnification objective lens for a macro image.

For example, as shown in the flowchart of FIGS. 15A and 15B, once the amount of movement of the biological specimen 1 in the X-axis/Y-axis directions is calculated in Step S6, the low-magnification objective lens 28 for macro observation is switched to the high-magnification objective lens 28 for micro observation (Step S7-h3). Then, the stage 11 is moved to a position such that the biological specimen 1 is contained in the viewing range of the high-magnification objective lens 28 (Step S8-h3), and, as shown in FIG. 16, the micro image 3 of the biological specimen 1 is acquired with the CCD 32. Step S8-h3 and Step S9 are performed in this way for each biological specimen 1 for which micro observation is to be performed.

When the next micro observation is to be performed subsequently, the stage 11 is returned to the initial position for the macro-image acquisition (Step S11), the high-magnification objective lens 28 is switched to the low-magnification objective lens 28 for macro observation (Step S12), and the process returns to Step S1 ("YES" in Step S10).

According to this modification, the high-definition micro image 3 can be acquired while tracking the biological specimen 1 with the high-magnification objective lens 28. When two or more target biological specimens 1 are included in the viewing range of the high-magnification objective lens 28, the micro image 3 may be acquired by moving the stage 11 to a position such that these biological specimens 1 are simultaneously kept within the viewing range of the high-magnification objective lens 28.

In this modification, the case in which the micro image 3 and the micro image are both acquired by the CCD 32 has been described; however, for example, as shown in the above-described embodiment, even when the macro image 3 is acquired by the CCD 32 and the micro image 4 is acquired by the micro-image acquisition unit 35, observation may also be performed similarly by switching between the objective lenses 28 each having different magnifications.

In this case, when adjusting the micro-observation position in the viewing range of the micro image 3, pan control of the galvanometer mirrors 26A and 26B may be used together therewith. For example, the stage 11 is moved to a position where a plurality of target biological specimens 1 are kept within the viewing range that can be supplemented by the galvano-zoom function of the high-magnification objective lens 28, and each micro image 3 of the individual biological specimens 1 should be acquired by pan control of the galvanometer mirrors 26A and 26B.

In addition, for example, when the micro image 3 and the macro image 4 are acquired by the micro-image acquisition unit 35, observation may also be similarly performed by switching between the objective lenses 28 each having different magnifications.

The embodiments of the present invention have been described above with reference to the drawings; however, the specific configuration is not limited to these embodiments, and design alterations, etc. within a range that does not depart from the gist of the present invention are also encompassed.

What is claimed is:

1. A method for creating an image of a moving live-cell specimen using an observation apparatus comprising a microscope system and an information storage unit, wherein the microscope system comprises a stage on which the live-cell specimen is mounted and an objective lens that collects observation light from the live-cell specimen while focusing illumination light thereon, the method comprising:
   acquiring, with the microscope system, a micro image of the live-cell specimen;
   acquiring, with the microscope system, a three-dimensional macro image of an observation region that includes the live-cell specimen, by varying a relative position of the objective lens and the live-cell specimen in an optical axis direction, wherein a viewing range of the microscope system when acquiring the macro image is larger than a viewing range of the microscope system when acquiring the micro image;

extracting identification information of the live-cell specimen included in the macro image by performing image processing on the macro image;
storing, in the information storage unit, identification information of the live-cell specimen which moves and which is observed as a target;
specifying, as a specified live-cell specimen, the live-cell specimen to which the extracted identification information corresponds in the identification information stored in the information storage unit;
calculating an amount of movement of the specified live-cell specimen included in the macro image; and
adjusting repeatedly, according to a movement of the live-cell specimen, a position of the viewing range of the microscope system in a direction that intersects an optical axis, based on the calculated amount of movement of the specified live-cell specimen, such that the specified live-cell specimen is included in the viewing range of the microscope system.

2. The method according to claim 1, wherein the observation apparatus further comprises a scanner and a light source, the method further comprising:
scanning, with the scanner, irradiation light emitted from the light source on the live-cell specimen;
detecting, with the microscope system, observation light from a scanning range of the irradiation light scanned in the observation region by the scanner, in the acquisition of the macro image;
detecting, with the microscope system, observation light from another scanning range of the irradiation light scanned in the observation region by the scanner, in the acquisition of the micro image; and
controlling a swing angle range of the scanner such that a scanning amplitude of the irradiation light is smaller when acquiring the micro image than when acquiring the macro image.

3. The method according to claim 2, further comprising:
adjusting a swing range position of the scanner such that the specified live-cell specimen is included in the viewing range of the microscope system.

4. The method according to claim 2, further comprising:
radiating, with the objective lens, the irradiation light scanned by the scanner onto the live-cell specimen; and
moving the stage, and adjusting relative positions of the objective lens and the stage in the direction that intersects the optical axis, such that the specified live-cell specimen is included in the viewing range of the microscope system.

5. The method according to claim 1, wherein the observation apparatus further comprises a scanner and a light source, the method further comprising:
scanning, with the scanner, irradiation light emitted from the light source on the live-cell specimen;
capturing, with the microscope system, observation light from an area in the observation region irradiated with the irradiation light emitted from the light source, in the acquisition of the macro image;
detecting, with the microscope system, observation light from a scanning range of the irradiation light scanned in the observation region by the scanner, in the acquisition of the micro image; and
controlling a swing angle range of the scanner such that the viewing range of the microscope system for the micro image is smaller than the viewing range thereof for the macro image.

6. The method according to claim 5, further comprising adjusting a swing range position of the scanner such that the specified live-cell specimen is included in the viewing range of the microscope system.

7. The method according to claim 5, further comprising:
radiating, with objective lens, the irradiation light scanned by the scanner onto the live-cell specimen, and
moving the stage, and adjusts relative positions of the objective lens and the stage in the direction that intersects the optical axis, such that the specified live-cell specimen is included in the viewing range of the microscope system.

8. The method according to claim 1, wherein the observation apparatus further comprises: (i) a plurality of objective lenses of different magnifications, and (ii) a revolver that holds the plurality of objective lenses and that disposes the plurality of objective lenses in an optical path of irradiation light in an exchangeable manner, the method further comprising:
collecting, with the plurality of objective lenses, observation light from the live-cell specimen and an observation region that includes the live-cell specimen;
capturing, with the microscope system, observation light coming from the observation region and collected by an objective lens from among the plurality of objective lenses having a low magnification, in the acquisition of the macro image;
capturing, with the microscope system, observation light coming from the live-cell specimen and collected by an objective lens from among the plurality of objective lenses having a high magnification, in the acquisition of the micro image; and
moving the stage, and adjusting relative positions of the objective lens having the high magnification and the stage in the direction that intersects the optical axis, such that the specified live-cell specimen is included in the viewing range of the microscope system.

9. The method according to claim 8, further comprising extracting the identification information of the live-cell specimen included in the macro image by using magnification information of the objective lens that acquires the micro image.

10. The method according to claim 1, further comprising adjusting relative positions of the objective lens and the stage in the direction that intersects the optical axis such that the specified live-cell specimen is included in the viewing range of the microscope system.

11. The method according to claim 10, further comprising:
acquiring a plurality of the macro images having adjacent observation regions; and
assembling the adjacent macro images.

12. The method according to claim 1, wherein:
the micro image of the live-cell specimen is acquired based on fluorescence excited by illumination light emitted from a first light source.

13. The method according to claim 1, further comprising rewriting the identification information of the live-cell specimen stored in the information storage unit with updated identification information of the live-cell specimen based on a change in the identification information of the live-cell specimen extracted from the macro image.

14. The method according to claim 1, further comprising:
storing identification information of live-cell specimens newly formed by cell division in the identification information storing unit; and assigning mutually linked identifiers to each of the new live-cell specimens formed by the cell division from a same live-cell specimen in response to the cell division of the live-cell specimen.

15. A method for creating an image of a moving live-cell specimen using an observation apparatus comprising a micro image light source, a microscope system, an information storage unit and a pan controller, wherein the microscope system comprises a stage on which the live-cell specimen is mounted and an objective lens that collects observation light from the live-cell specimen while focusing illumination light thereon, the method comprising:
   radiating, with the micro image light source, excitation light onto the live-cell specimen;
   acquiring, with the microscope system, a three-dimensional macro image of an observation region that includes the live-cell specimen, by varying a relative position of the objective lens and the live-cell specimen in an optical axis direction;
   acquiring, with the microscope system, a micro image of the live-cell specimen by detecting fluorescence generated at a position in the live-cell specimen irradiated by the excitation light emitted from the micro image light source, wherein a viewing range of the microscope system when acquiring the macro image is larger than a viewing range of the microscope system when acquiring the micro image;
   extracting identification information of the live-cell specimen included in the macro image by performing image processing on the macro image;
   storing, in the information storage unit, identification information of the live-cell specimen which moves and which is observed as a target;
   specifying, as a specified live-cell specimen, the live-cell specimen to which the extracted identification information corresponds in the identification information stored in the information storage unit;
   moving repeatedly, with the pan controller and according to a movement of the live-cell specimen, a position of a capturing range of the microscope system in a direction that intersects an optical axis such that the specified live-cell specimen is included in the capturing range of the microscope system.

16. The method according to claim 15, wherein the microscope system further comprises a scanner and a detector, the method further comprising:
   scanning, with the scanner, the excitation light emitted from the micro image light source;
   detecting, with the detector, the fluorescence generated at the live-cell specimen;
   constructing the micro image based on the fluorescence detected by the detector; and
   adjusting a swing angle range of the scanner.

17. The method according to claim 15, further comprising:
   irradiating, with the objective lens, the live-cell specimen with the excitation light emitted from the micro image light source;
   collecting, with the objective lens, the fluorescence generated at the position irradiated by the excitation light; and
   moving, with the pan controller, the stage in the direction that intersects the optical axis.

18. The method according to claim 15, further comprising rewriting the identification information of the live-cell specimen stored in the information storage unit with updated identification information of the live-cell specimen based on a change in the identification information of the live-cell specimen extracted from the macro image.

19. The method according to claim 15, further comprising:
   storing identification information of live-cell specimens newly formed by cell division in the information storage unit; and
   assigning mutually linked identifiers to each of the new live-cell specimens formed by the cell division from a same live-cell specimen in response to the cell division of the live-cell specimen.

20. The method according to claim 15, wherein:
   the observation apparatus further comprises a plurality of objective lenses having different magnifications and provided in an exchangeable manner, and
   the extracting the identification information of the live-cell specimen uses magnification information of the plurality of objective lenses.

* * * * *